United States Patent
Matsunobu et al.

(10) Patent No.: US 10,721,483 B2
(45) Date of Patent: Jul. 21, 2020

(54) IMAGE CODING METHOD, IMAGE DECODING METHOD, IMAGE CODING APPARATUS, IMAGE DECODING APPARATUS, AND IMAGE CODING-DECODING APPARATUS

(71) Applicant: Sun Patent Trust, New York, NY (US)

(72) Inventors: Toru Matsunobu, Osaka (JP); Takahiro Nishi, Nara (JP); Youji Shibahara, Tokyo (JP); Hisao Sasai, Osaka (JP); Kyoko Tanikawa, Osaka (JP); Toshiyasu Sugio, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/173,435

(22) Filed: Oct. 29, 2018

(65) Prior Publication Data

US 2019/0068979 A1 Feb. 28, 2019

Related U.S. Application Data

(63) Continuation of application No. 15/919,339, filed on Mar. 13, 2018, now Pat. No. 10,148,967, which is a
(Continued)

(51) Int. Cl.
  *H04N 7/12* (2006.01)
  *H04N 11/02* (2006.01)
  (Continued)

(52) U.S. Cl.
  CPC ......... *H04N 19/176* (2014.11); *H04N 19/117* (2014.11); *H04N 19/124* (2014.11);
  (Continued)

(58) Field of Classification Search
  None
  See application file for complete search history.

(56) References Cited

U.S. PATENT DOCUMENTS 5,392,037 A 2/1995 Kato
5,495,298 A 2/1996 Uchida et al.
(Continued)

FOREIGN PATENT DOCUMENTS

| JP | 5-37919 | 2/1993 |
|---|---|---|
| JP | 2000-125298 | 4/2000 |
| JP | 2003-219425 | 7/2003 |
| JP | 2005-20384 | 1/2005 |
| WO | 2009/088353 | 7/2009 |
| WO | 2010/113524 | 10/2010 |

OTHER PUBLICATIONS

International Search Report dated Oct. 2, 2012 in International Application No. PCT/JP2012/004136.
(Continued)

*Primary Examiner* — Rebecca A Volentine
(74) *Attorney, Agent, or Firm* — Wenderoth, Lind & Ponack, L.L.P.

(57) ABSTRACT

An image coding method includes: generating a predicted block; calculating a residual block; calculating quantized coefficients by performing transform and quantization on the residual block; calculating a coded residual block by performing inverse quantization and inverse transform on the quantized coefficients; generating a temporary coded block; determining whether or not an offset process is required, to generate first flag information indicating a result of the determination; executing the offset process on the temporary coded block when it is determined that the offset process is required; and performing variable-length coding on the quantized coefficients and the first flag information.

1 Claim, 42 Drawing Sheets

Related U.S. Application Data continuation of application No. 15/725,709, filed on Oct. 5, 2017, now Pat. No. 9,948,936, which is a continuation of application No. 15/194,760, filed on Jun. 28, 2016, now Pat. No. 9,813,717, which is a continuation of application No. 13/954,368, filed on Jul. 30, 2013, now Pat. No. 9,497,470, which is a continuation of application No. 13/817,316, filed as application No. PCT/JP2012/004136 on Jun. 26, 2012, now Pat. No. 8,780,981.

(60) Provisional application No. 61/501,384, filed on Jun. 27, 2011.

(51) Int. Cl.

| | | |
|---|---|---|
| H04N 11/04 | (2006.01) | |
| H04N 19/176 | (2014.01) | |
| H04N 19/46 | (2014.01) | |
| H04N 19/13 | (2014.01) | |
| H04N 19/593 | (2014.01) | |
| H04N 19/117 | (2014.01) | |
| H04N 19/17 | (2014.01) | |
| H04N 19/61 | (2014.01) | |
| H04N 19/154 | (2014.01) | |
| H04N 19/124 | (2014.01) | |
| H04N 19/172 | (2014.01) | |
| H04N 19/50 | (2014.01) | |
| H04N 19/93 | (2014.01) | |
| H04N 19/90 | (2014.01) | |

(52) U.S. Cl.
CPC ........... *H04N 19/13* (2014.11); *H04N 19/154* (2014.11); *H04N 19/17* (2014.11); *H04N 19/172* (2014.11); *H04N 19/46* (2014.11); *H04N 19/50* (2014.11); *H04N 19/593* (2014.11); *H04N 19/61* (2014.11); *H04N 19/93* (2014.11); *H04N 19/90* (2014.11)

(56) References Cited

U.S. PATENT DOCUMENTS

| | | | |
|---|---|---|---|
| 6,658,157 | B1 | 12/2003 | Satoh et al. |
| 7,221,706 | B2 | 5/2007 | Zhao et al. |
| 2003/0031128 | A1 | 2/2003 | Kim et al. |
| 2003/0053454 | A1 | 3/2003 | Katsavounidis et al. |
| 2003/0053537 | A1 | 3/2003 | Kim et al. |
| 2005/0053295 | A1 | 3/2005 | Holcomb |
| 2005/0053300 | A1 | 3/2005 | Mukerjee |
| 2008/0170615 | A1 | 7/2008 | Sekiguchi |
| 2008/0317377 | A1* | 12/2008 | Saigo ............... H04N 9/045 382/274 |
| 2009/0238275 | A1 | 9/2009 | Chujoh et al. |
| 2009/0257500 | A1 | 10/2009 | Karczewicz |
| 2010/0074332 | A1 | 3/2010 | Karczewicz |
| 2010/0142811 | A1 | 6/2010 | Okamoto et al. |
| 2010/0208829 | A1 | 8/2010 | Jang et al. |
| 2010/0278269 | A1 | 11/2010 | Andersson et al. |
| 2012/0027083 | A1 | 2/2012 | Narroschke et al. |
| 2013/0329785 | A1* | 12/2013 | Lim ............... H04N 19/463 375/240.03 |
| 2014/0192891 | A1 | 7/2014 | Alshina |

OTHER PUBLICATIONS

ISO/IEC 14496-10 (MPEG-4 Part10: Advanced Video Coding), Oct. 1, 2004.

Thomas Wiegand et al., "Overview of the H.264/AVC Video Coding Standard", IEEE Transactions on Circuits and Systems for Video Technology, vol. 13, No. 7, Jul. 2003, pp. 560-576.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, ver.7, 5th Meeting: Geneva, CH, Mar. 16-23, 2011, http://phenix.int-evry.fr/jct/doc_end_user/documents/5_Geneva/wg11/JCTVC-E603-v7.zip.

Steffen Wittmann et al., "Post-filter SEI message for 4:4:4 coding", Joint Video Team (JVT) of ISO/IEC MPEG & ITU-T VCEG (ISO/IEC JTC1/SC29/WG11 and ITU-T SG16 Q.6), JVT-S030, 18th Meeting: Geneva, Switzerland, Mar. 31-Apr. 7, 2006.

Yu-Lin Chang et al., "CE8 Subset3: Controlled Clipping", hmmJoint Collaborative Team on Video Coding (JCT-VC) of ITU-T SG16 WP3 and ISO/IEC JTC1/SC29/WG11, JCTVC-D123, 4th Meeting: Daegu, KR, Jan. 20-28, 2011.

Chih-Ming Fu et al., "CE13: Sample Adaptive Offset with LCU-Independent Decoding", Joint Collaborative Team on Video Coding (JCT-VC) of ITU-T SG16 WP3 and ISO/IEC JTC1/SC29/WG11, JCTVC-E049, 5th Meeting: Geneva, CH, Mar. 16-23, 2011.

Toru Matsunobu et al., "Chroma DC offset for intra coding", Joint Collaborative Team on Video Coding (JCT-VC) of ITU-T SG16 WP3 and ISO/IEC JTC1/SC29/WG11, JCTVC-F479, 6th Meeting: Torino, IT, Jul. 14-22, 2011.

Koohyar Minoo et al., "Non-CE1: Coding of SAO merge left and merge up", Joint Collaborative Team on Video Coding (JCT-VC) of ITU-T SG 16 WP 3 and ISO/IEC JTC 1/SC 29/WG 11 9th Meeting: Geneva, CH, Document: JCTVC-I0507, May 2012.

Chih-Ming Fu et al.; "CE8 Subtest3: Picture Quadtree Adaptive Offset"; Joint Collaborative Team on Video Coding (JCT-VC) of ITU-T SG16 WP3 and ISO/IEC JTC1/SC29/WG11 4th Meeting: Daegu, KR; Document: JCTVC-D122; Jan. 2011.

Yu-Wen Huang et al.; "In-Loop Adaptive Restoration"; Joint Collaborative Team on Video Coding (JCT-VC) of ITU-T SG16 WP3 and ISO/IEC JTC1/SC29/WG11 2nd Meeting: Geneva, CH; Document JCTVC-B077; Jul. 2010.

Chih-Ming Fu et al.; "TE10 Subtest 3: Quadtree-based Adaptive Offset"; Joint Collaborative Team on Video Coding (JCT-VC) of ITU-T SG16 WP3 and ISO/IEC JTC1/SC29/WG11 3rd Meeting: Guangzhou, CN; Document JCTVC-C147; Oct. 2010.

Notice of Allowance dated Mar. 4, 2014 in U.S. Appl. No. 13/817,316.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, ver.7, 5th Meeting: Geneva, CH, Mar. 16-23, 2011, http://phenix.int-evry.fr/jct/doc_end_user/documents/5_Geneva/wg11/JCTVC-E603-v7.zip, Sections 7.3.3.4 and 7.4.3.4.

Extended European Search Report dated Oct. 23, 2014 in European Application No. 12803742.1.

Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, JCTVC-A124, 1st Meeting: Dresden, DE, Apr. 15-23, 2010.

Notice of Allowance and Notice of Allowability dated Mar. 31, 2016 in U.S. Appl. No. 14/295,694.

Notice of Allowance and Notice of Allowability dated Apr. 28, 2016 in U.S. Appl. No. 14/957,784.

Office Action with Search Report dated Aug. 16, 2016 in Chinese Patent Application No. 201280002364.2, with English translation of Search Report.

Fu et al., "CE8 Subset3: Picture Quadtree Adaptive Offset," Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D122_r3 (Version 4).

Chen et al., "CE8 Subset2: A Joint Proposal on Improving the Adaptive Loop Filter in TMuC0.9 by MediaTek, Qualcomm, and Toshiba," Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D119.

Office Action dated Oct. 10, 2016 in European Patent Application No. 12803742.1.

\* cited by examiner

FIG. 21

| prediction_unit( x0,y0, log2PUWidth, log2PUHeight, PartIdx , InferredMergeFlag ) { | Descriptor |
|---|---|
| if( skip_flag[x0][y0]){ | |
|   if( NumMergeCand > 1) | |
|     merge_idx[x0][y0] | ue(v)\| ae(v) |
|   } else if( PreMode == MODE_INTRA){ | |
|     prev_intra_luma_pred_flag[x0][y0] | u(1)\| ae(v) |
|     if( prev_intra_luma_pred_flag[x0][y0]) | |
|       if( NumMPMCand > 1) | |
|         mpm_idx[x0][y0] | u(1)\| ae(v) |
|     else | |
|       rem_intra_luma_pred_mode[x0][y0] | ce(v)\| ae(v) |
|     intra_chroma_pred_mode[x0][y0] | ue(v)\| ae(v) |
|     intra_chroma_oft[0]  *(Offset value of U)* | |
|     intra_chroma_oft[1]  *(Offset value of V)* | |
|   } else {/* MODE_INTER */ | |
|     if(!InferreMergeFlag) | |
|       if(entropy_coding_mode_flag \|\| PartMode !=PART_2Nx2N) | |
|         merge_flag[x0][y0] | u(1)\| ae(v) |
|       if(merge_flag[x0][y0] && NumMergeCand > 1){ | |
|         merge_idx[x0][y0] | ue(v)\| ae(v) |
|     } else { | |
|       if( slice_type == B) | |
|         inter_pred_flag[x0][y0] | ue(v)\| ae(v) |
|       if( inter_pred_flag[x0][y0] == Pred_LC){ | |
|         if( num_ref_idx_lc_active_minusl > 0) | |
|           ref_idx_lc[x0][y0] | ue(v)\| ae(v) |
|         mvd_lc[x0][y0][0] | se(v)\| ae(v) |
|         mvd_lc[x0][y0][1] | se(v)\| ae(v) |
|         if( NumMVPCand(LcToLx) > 1) | |
|           mvp_idx_lc[x0][y0] | ue(v)\| ae(v) |
|       } | |
|       else { /* Prsd_L0 or Pred_BI */ | |
|         if( num_ref_idx_l0_active_minus 1 > 0) | |
|           ref_idx_l0[x0][y0] | ue(v)\| ae(v) |
|         mvd_l0[x0][y0][0] | se(v)\| ae(v) |
|         mvd_l0[x0][y0][1] | se(v)\| ae(v) |
|         if( NumMVPCand(L0) > 1) | |
|           mvp_idx_l0[x0][y0] | ue(v)\| ae(v) |
|       } | |
|       if(inter_pred_flag[x0][y0] == Pred_BI){ | |
|         if(num_ref_idx_l1_active_minus 1 > 0) | |
|           ref_idx_l1[x0][y0] | ue(v)\| ae(v) |
|         mvd_l1[x0][y0][0] | se(v)\| ae(v) |
|         mvd_l1[x0][y0][1] | se(v)\| ae(v) |
|         if( NumMVPCand(L1) > 1) | |
|           mvp_idx_l1[x0][y0] | ue(v)\| ae(v) |
|       } | |
|     } | |
|   } | |
| } | |

FIG. 22

| slice_data( ){ | Descriptor |
|---|---|
| CurrTbAddr = first_tb_in_slice | |
| moreDataFlag = 1 | |
| if( adaptive_loop_filter_flag && alf_cu_control_flag) | |
| AlfCuFlagIdx = -1 | |
| do { | |
| xCU = HorLumaLocation( CurrTbAddr) | |
| yCU = VerLumaLocation( CurrTbAddr) | |
| if(Slice_type==I){ | |
| intra_chroma_oft[0] | |
| intra_chroma_oft[1] | |
| } | |
| coding_tree( xCU, yCU, Log2TbSize) | |
| if( lentropy_coding_mode_flag) | |
| moreDataFlag = more_rbsp_data( ) | |
| else { | |
| end_of_slice_flag | ae(v) |
| moreDataFlag = !end_of_slice_flag | |
| } | |
| CurrTbAddr = NextTbAddress( CurrTbAddr) | |
| } while( moreDataFlag) | |
| } | |

Offset value of U → intra_chroma_oft[0]
Offset value of V → intra_chroma_oft[1]

FIG. 29

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 32
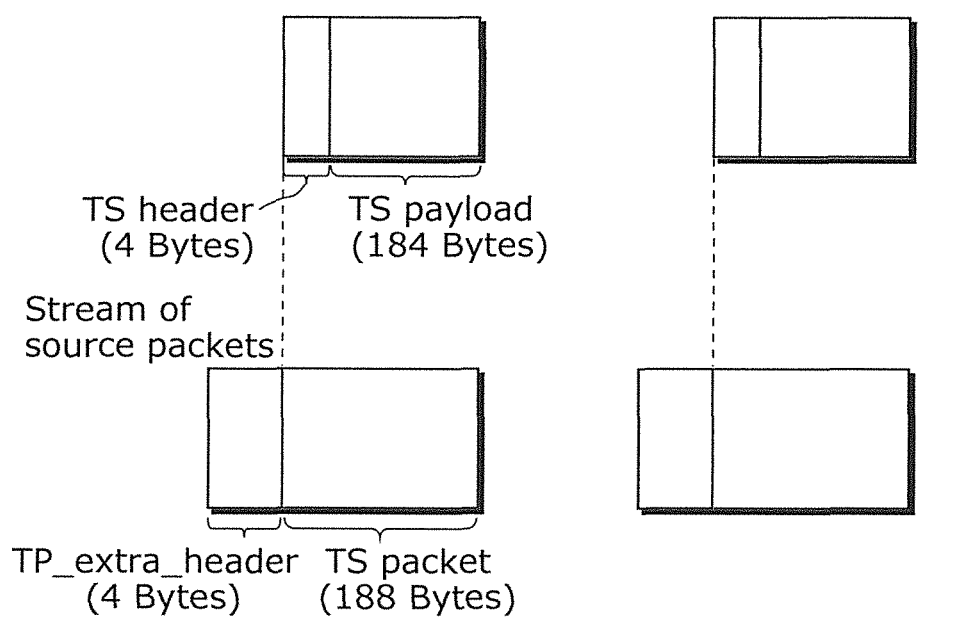
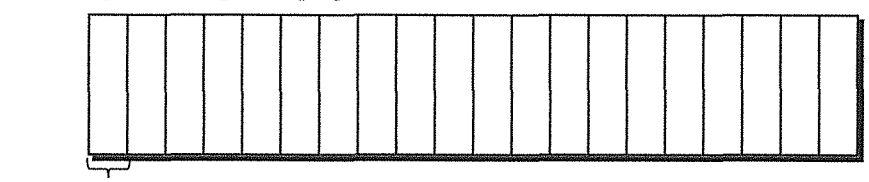

FIG. 40

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, IMAGE DECODING APPARATUS, AND IMAGE CODING-DECODING APPARATUS

TECHNICAL FIELD

The present invention relates to an image coding method, an image decoding method, an image coding apparatus, an image decoding apparatus, and an image coding-decoding apparatus. In particular, the present invention relates to an image coding method, an image decoding method, an image coding apparatus, an image decoding apparatus, and an image coding-decoding apparatus with less loss in image quality.

BACKGROUND ART

In recent years, the number of applications used for, for example, video-on-demand type service including videoconferencing, digital video broadcasting, and video content streaming via the Internet is increasing. These applications are dependent on the transmission of video data. When the video data is transmitted or recorded, a significant amount of data is transmitted through a conventional transmission channel having a limited bandwidth or is recorded into a conventional recording medium having a limited data capacity. In order to transmit the video data through the conventional transmission channel or record the video data into the conventional recording medium, it is absolutely essential to compress or reduce the amount of digital data.

With this being the situation, multiple video coding standards have been developed for video data compression. Examples of the video coding standards include the standards of the International Telecommunication Union Telecommunication Standardization Sector (ITU-T) specified by "H.26x" and the International Standards Organization/International Electrotechnical Commission (ISO/IEC) specified by "MPEG-x". Currently, the latest and most advanced video coding standard is presented by the H.264/AVC or MPEG-4 AVC standard (see Non Patent Literatures 1 and 2).

Moreover, various studies are made to improve the coding efficiency by the High Efficiency Video Coding (HEVC) standard which is a next-generation image coding standard (see Non Patent Literature 3).

CITATION LIST

Non Patent Literature

[NPL 1]
ISO/IEC 14496-10 "MPEG-4 Part 10, Advanced Video Coding"
[NPL 2]
Thomas Wiegand et al, "Overview of the H.264/AVC Video Coding Standard", IEEE TRANSACTIONS ON CIRCUITS AND SYSTEMS FOR VIDEO TECHNOLOGY, JULY 2003, PP. 1-1
[NPL 3]
Joint Collaborative Team on Video Coding (JCT-VC) of ITU-T SG16 WP3 and ISO/IEC JTC1/SC29/WG11 5th Meeting: Geneva, CH,—6-23 March 2011 JCTVC-E603 Title:WD3: Working Draft 3 of High-Efficiency Video Coding ver.7 http://phenix.int-evry.fr/jct/doc_end_user/documents/5_Geneva/wg11/JCTVC-E603-v7.zip

SUMMARY OF INVENTION

Technical Problem

In recent years, image quality is required to be improved while the coding efficiency is maintained.

In view of this, the present invention is conceived to solve the aforementioned conventional problem, and has an object to provide an image coding method and an image decoding method capable of improving a coded image and a decoded image in image quality.

Solution to Problem

The image coding method in an aspect according to the preset invention is a method of coding an input block included in an image. To be more specific, the image coding method includes generating a predicted block by predicting the input block; calculating a residual block by subtracting the predicted block from the input block; calculating quantized coefficients by performing transform and quantization on the residual block; calculating a coded residual block by performing inverse quantization and inverse transform on the quantized coefficients; generating a temporary coded block by adding the coded residual block to the predicted block; determining whether or not an offset process for correcting an error included in the temporary coded block is required, to generate first flag information indicating a result of the determination, the error being caused by the quantization in the calculating of quantized coefficients; executing the offset process on the temporary coded block when it is determined in the determining that the offset process is required; and performing variable-length coding on the quantized coefficients and the first flag information.

It should be noted that a general or specific embodiment in an aspect may be implemented by a system, a method, an integrated circuit, a computer program, or a recording medium, or by any combination of a system, a method, an integrated circuit, a computer program, and a recording medium.

Advantageous Effects of Invention

The present invention can reduce distortion of a chroma signal and improve subjective image quality.

BRIEF DESCRIPTION OF DRAWINGS

FIG. 21 is a diagram showing a prediction unit syntax which is an example of chroma-signal intra prediction in Embodiment 4 according to the present invention.

FIG. 22 is a diagram showing slice data syntax which is an example of chroma-signal intra prediction in Embodiment 6 according to the present invention.

FIG. 29 illustrates a structure of multiplexed data.

FIG. 32 shows a structure of TS packets and source packets in the multiplexed data.

FIG. 40 shows an example of a look-up table in which video data standards are associated with driving frequencies.

DESCRIPTION OF EMBODIMENTS

[Knowledge Forming Basis of Present Invention]

Figure 1:
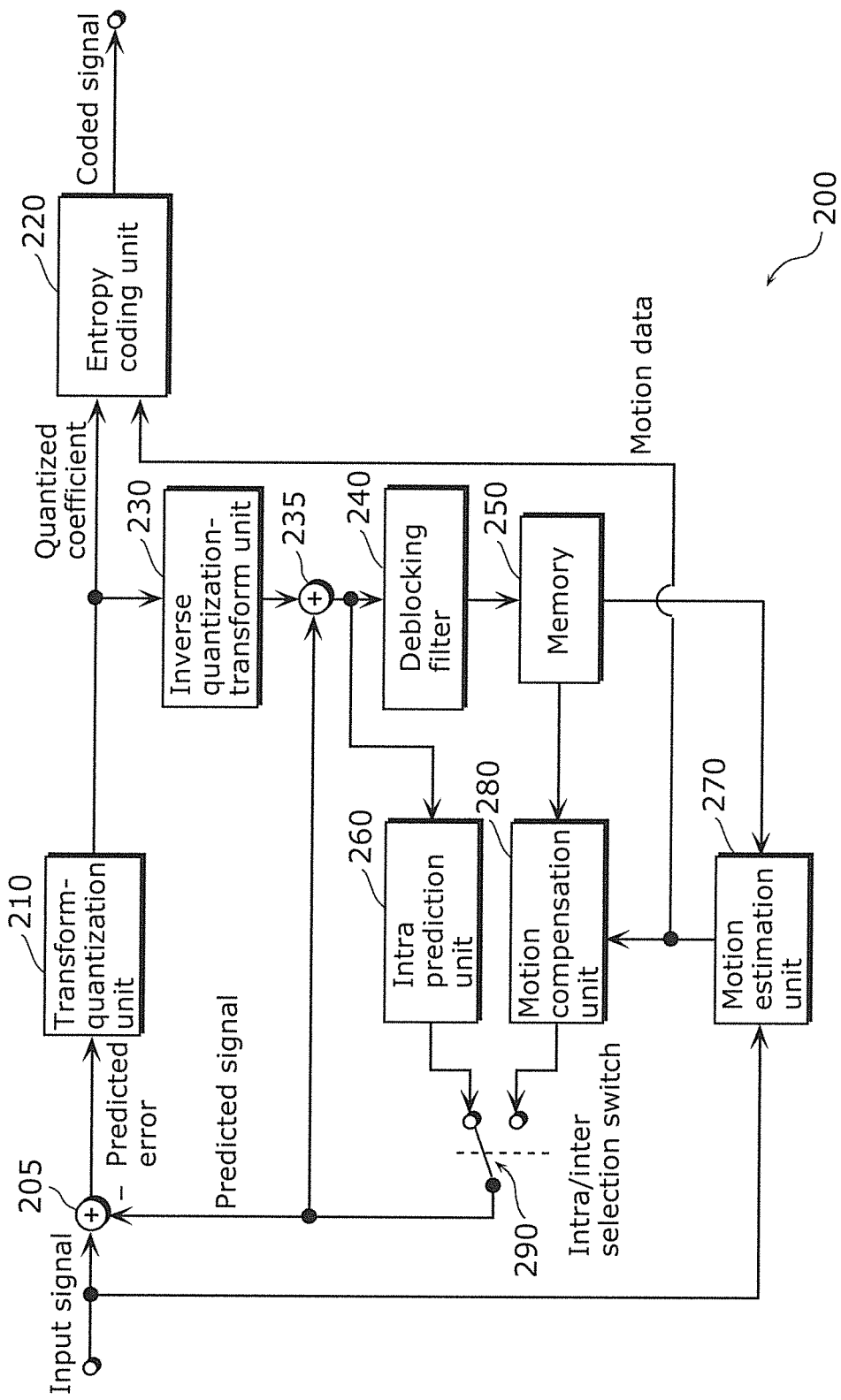
FIG. 1 is a block diagram showing an example of a configuration of an image coding apparatus in Embodiment 1 according to the present invention.
Figure 12:
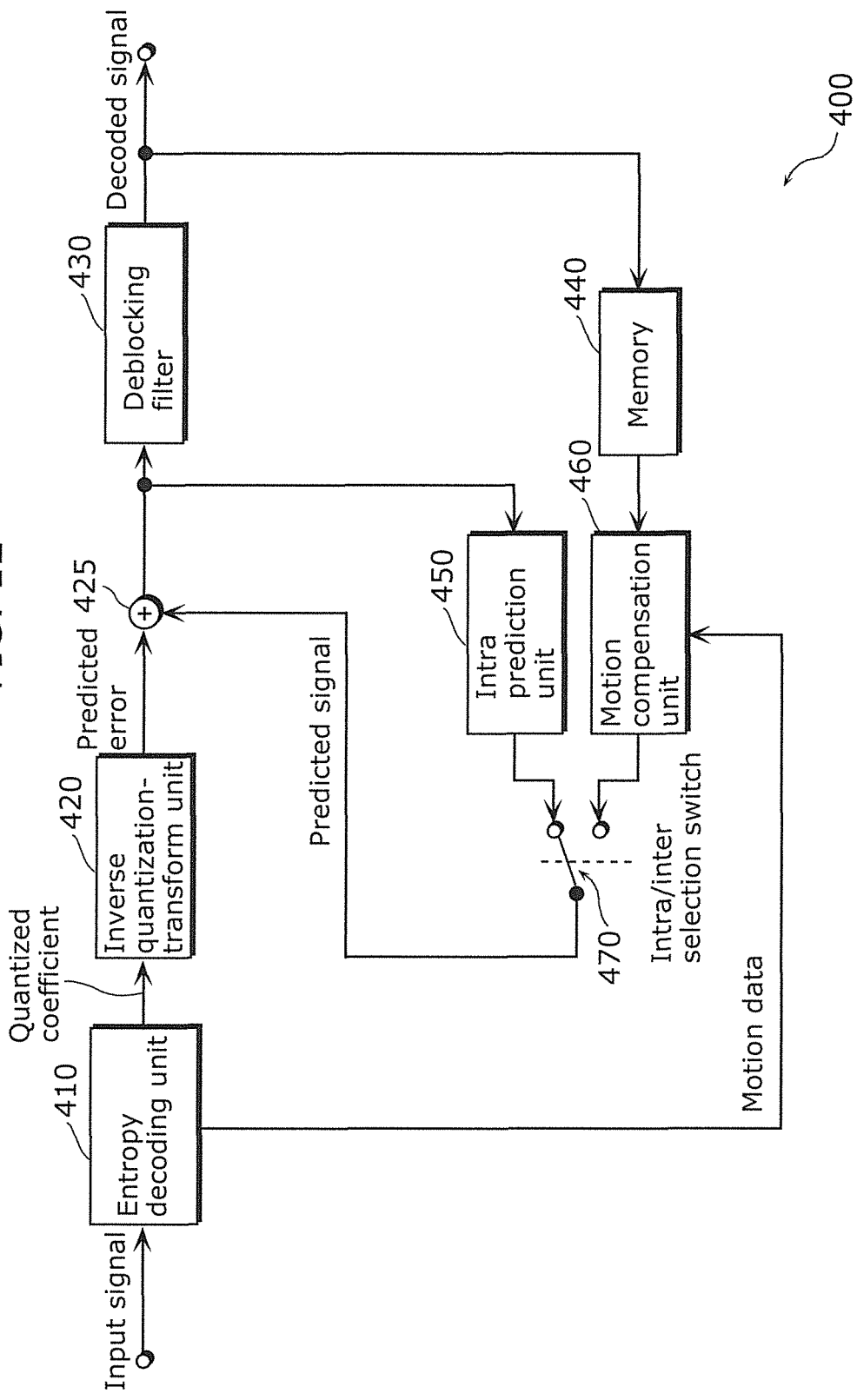
FIG. 12 is a block diagram showing an example of a configuration of an image decoding apparatus in Embodiment 4 according to the present invention.

As shown in FIG. 1 and FIG. 12 for example, HEVC mainly includes processes such as prediction, transform, quantization, and entropy coding. Among these, prediction in turn includes inter frame prediction and intra prediction. Intra prediction is a process where a predicted pixel is generated by interpolation from neighboring pixels in neighboring macroblocks located, for example, above and on the left of a current macroblock to be processed and a difference from the predicted pixel is coded. Intra prediction according to the HEVC standard makes prediction at a pixel level instead of a discrete cosine transform (DCT) coefficient level, and also uses pixel prediction patterns in vertical, horizontal, and diagonal directions.

Conventional intra prediction of a chroma signal is described, with reference to FIG. 2, FIG. 3, FIG. 13, and FIG. 14.

Figure 2:
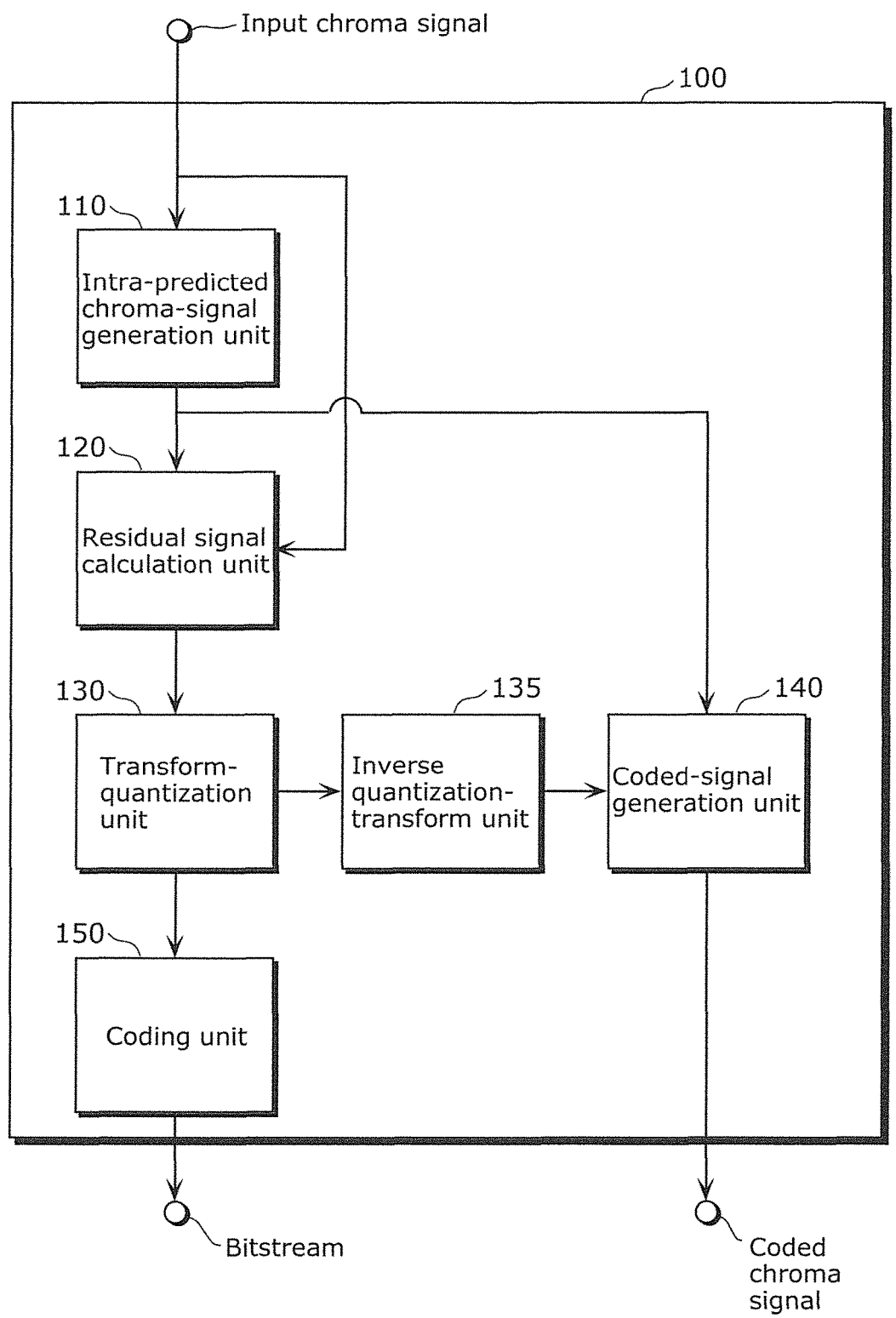
FIG. 2 is a block diagram showing an example of a conventional method of coding a chroma signal.

A configuration of a chroma-signal intra prediction unit 100 that performs chroma-signal intra prediction according to a conventional image coding method is described. FIG. 2 is a block diagram showing an example of the conventional chroma-signal intra prediction unit 100.

As shown in FIG. 2, the chroma-signal intra prediction unit 100 includes an intra-predicted chroma-signal generation unit 110, a residual signal calculation unit 120, a transform-quantization unit 130, an inverse quantization-transform unit 135, a coded-signal generation unit 140, and a coding unit 150.

Figure 3:
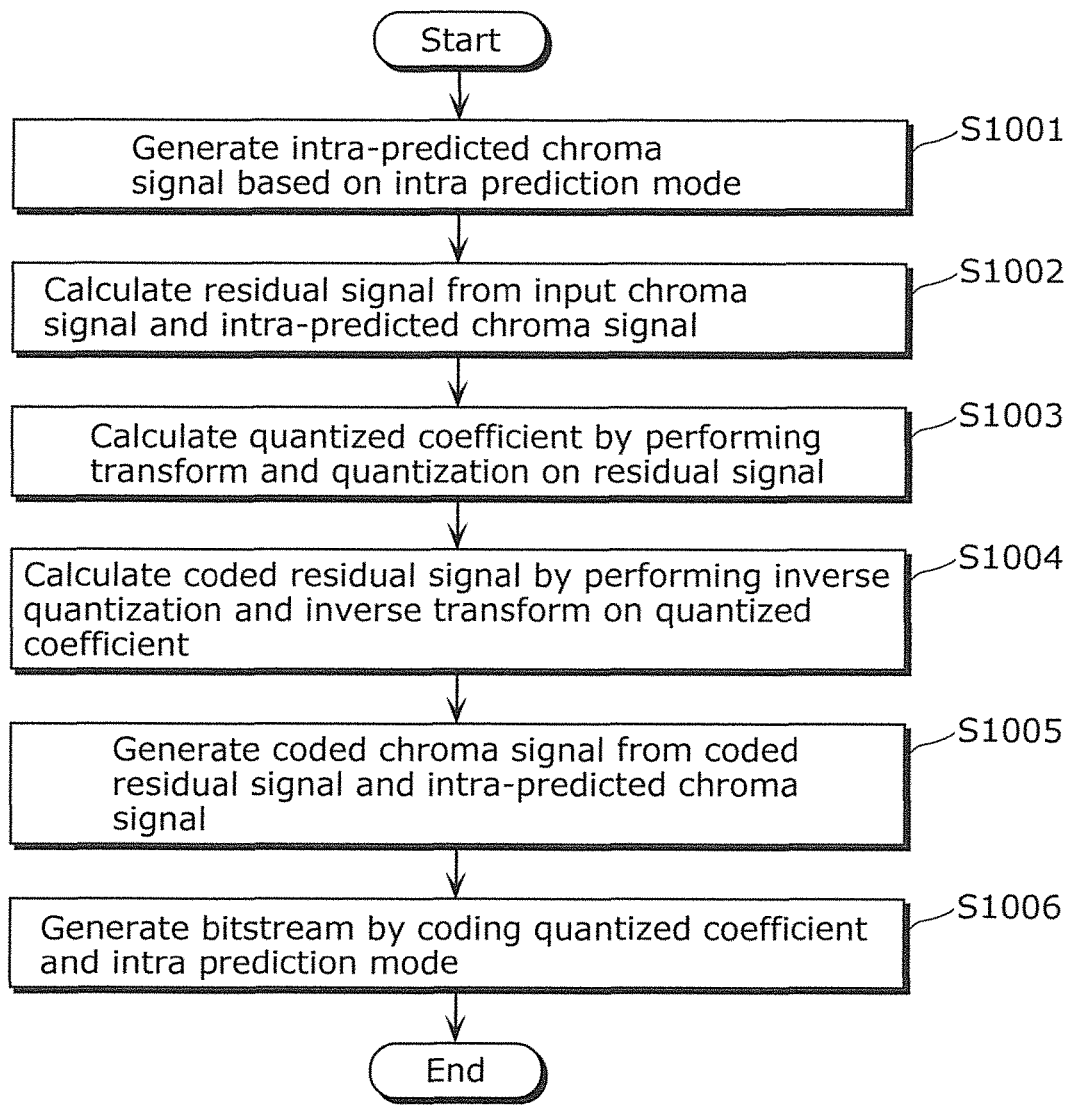
FIG. 3 is a flowchart showing an example of a conventional method of coding a chroma signal.

An operation performed by the conventional chroma-signal intra prediction unit 100 is described in more detail. FIG. 3 is a flowchart showing a process performed by the chroma-signal intra prediction unit 100.

Firstly, the intra-predicted chroma-signal generation unit 110 generates an intra-predicted chroma signal based on an intra prediction mode, and outputs the generated signal to the residual signal calculation unit 120 and the coded-signal generation unit 140 (Step S1001). The intra prediction mode is indicated as an index number assigned to a method of generating an intra-predicted chroma signal. The intra-predicted chroma signal is generated according to the intra prediction mode using, as appropriate, a coded luma signal of a neighboring block, a coded chroma signal of a neighboring block, and a coded luma signal of the current block to be processed.

Next, the residual signal calculation unit 120 calculates a residual signal from an input chroma signal and the intra-predicted chroma signal, and outputs the residual signal to the transform-quantization unit 130 (Step S1002). The residual signal is obtained by calculating a difference between the input chroma signal and the intra-predicted chroma signal.

Next, the transform-quantization unit 130 calculates quantized coefficients by performing transform and quantization on the residual signal, and outputs the quantized coefficients to the inverse quantization-transform unit 135 and the coding unit 150 (Step S1003). Here, transform refers to a process of transforming the residual signal in a space domain into coefficients in a frequency domain. By quantization, the coefficient value in the frequency domain obtained by transforming the residual signal is approximated more roughly. A value indicating the roughness is referred to as a quantization parameter (may also be referred to as the QP hereafter). When the QP is greater, rougher approximation is performed, meaning that an error (a quantization error) is greater between the original input chroma signal and the coded chroma signal described later.

Next, the inverse quantization-transform unit 135 calculates a coded residual signal by performing inverse quantization and inverse transform on the quantized coefficients, and outputs the coded residual signal to the coded-signal generation unit 140 (Step S1004). Inverse quantization and inverse transform are performed by a procedure exactly opposite to the procedure in Step S1003.

After this, the coded-signal generation unit 140 generates a coded chroma signal from the coded residual signal and the intra-predicted chroma signal (Step S1005). The coded-signal generation unit 140 stores the generated coded chroma signal into a memory that is not illustrated in the diagram. The coded chroma signal stored into the memory is used, as a coded signal of a neighboring block, by the intra-predicted chroma-signal generation unit 110 in order to generate an intra-predicted chroma signal. The same holds true for a coded luma signal (an explanation thereof is omitted). The coded chroma signal is calculated by adding the coded residual signal to the intra-predicted chroma signal.

Next, the coding unit 150 generates a bitstream by coding the quantized coefficients and the intra prediction mode (Step S1006). In coding, a variable code is assigned to the quantized coefficients in order for the bit length to be short and, as a result, the compression efficiency is improved. The bitstream obtained by the efficient data compression is transferred or recorded.

Figure 13:
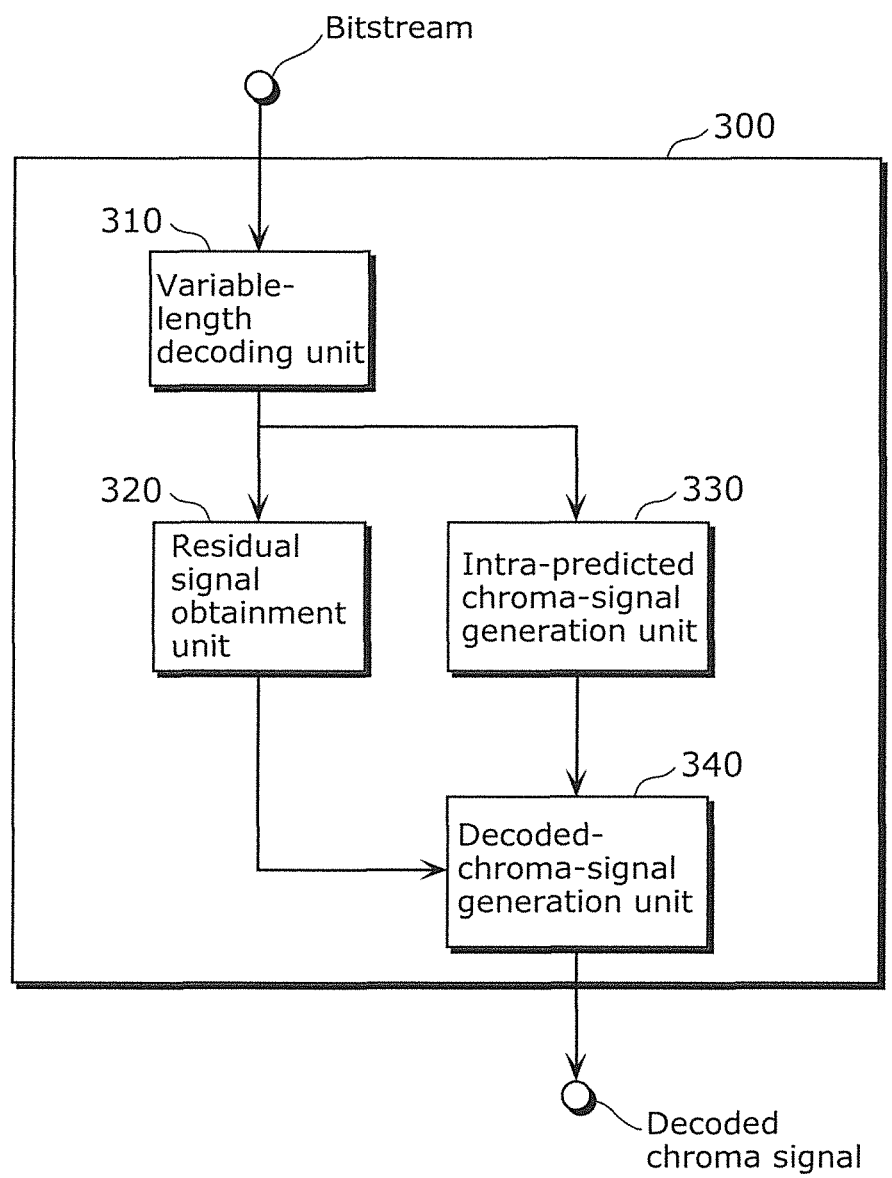
FIG. 13 is a block diagram showing an example of a conventional method of decoding a chroma signal.

A configuration of a chroma-signal intra prediction unit 300 that performs chroma-signal intra prediction according to a conventional image decoding method is described. FIG. 13 is a block diagram showing an example of the conventional chroma-signal intra prediction unit 300.

As shown in FIG. 13, the chroma-signal intra prediction unit 300 includes a variable-length decoding unit 310, a residual signal obtainment unit 320, an intra-predicted chroma-signal generation unit 330, and a decoded-chroma-signal generation unit 340.

Figure 14:
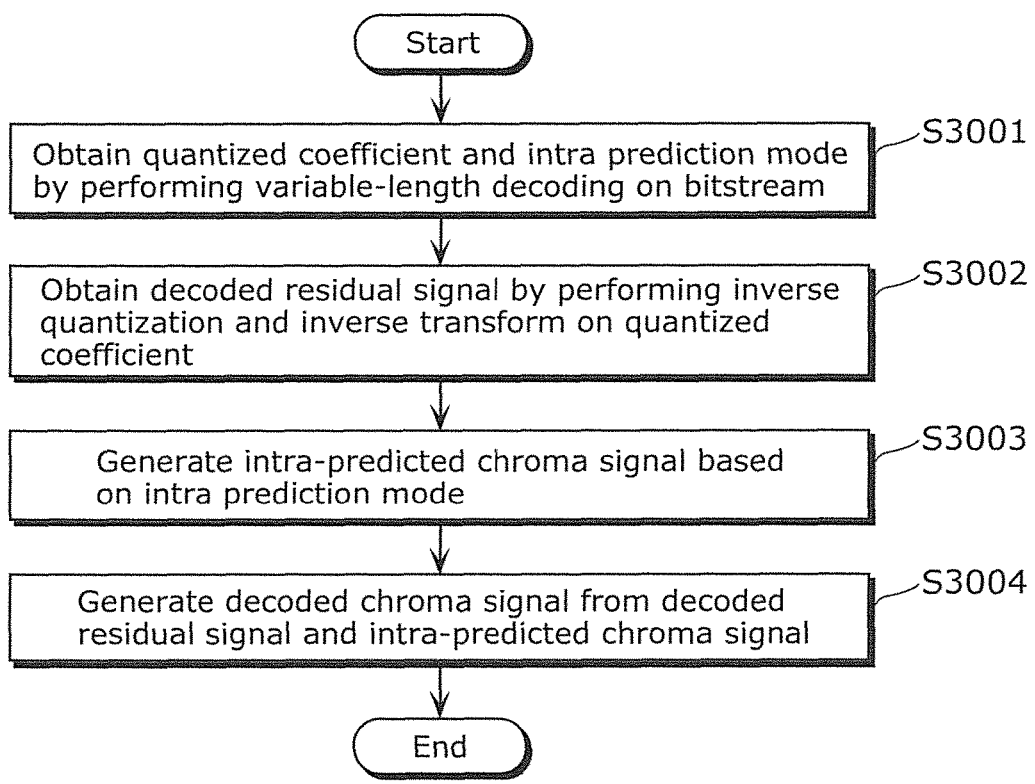
FIG. 14 is a flowchart showing an example of a conventional method of decoding a chroma signal.

An operation performed by the conventional chroma-signal intra prediction unit 300 is described in more detail, with reference to FIG. 14. FIG. 14 is a flowchart showing a process performed by the chroma-signal intra prediction unit 300.

Firstly, the chroma-signal intra prediction unit 300 obtains quantized coefficients and an intra prediction mode by performing variable-length decoding on the bitstream, and outputs the quantized coefficients and the intra prediction mode to the residual signal obtainment unit 320 and the intra-predicted chroma-signal generation unit 330 (Step S3001).

Next, the residual signal obtainment unit 320 obtains a decoded residual signal by performing inverse quantization and inverse transform on the quantized coefficients, and outputs the decoded residual signal to the decoded-chroma-signal generation unit 340 (Step S3002). The decoded residual signal has been approximated more roughly by the quantization at the time of coding. On account of this, when the decoded chroma signal is generated using this residual signal, an error with respect to the original input image is caused.

Next, the intra-predicted chroma-signal generation unit 330 generates an intra-predicted chroma signal based on the intra prediction mode, and outputs the intra-predicted chroma signal to the decoded-chroma-signal generation unit 340 (Step S3003). The intra-predicted chroma signal is generated according to the intra prediction mode using, as appropriate, a decoded luma signal of a neighboring block, a decoded chroma signal of a neighboring block, and a decoded luma signal of the current block to be processed.

Next, the decoded-chroma-signal generation unit 340 generates a decoded chroma signal from the decoded residual signal and the intra-predicted chroma signal (Step S3004). The decoded chroma signal is calculated by adding the decoded residual signal to the intra-predicted chroma signal. The decoded chroma signal generated by the decoded-chroma-signal generation unit 340 is stored into a memory, which is not illustrated in the diagram, and is used for a later intra prediction process, for example.

According to the aforementioned conventional technology, however, quantization is performed when the residual signal indicating a difference between the input signal and the predicted signal is coded. For this reason, when the QP is greater, an error is greater between the input signal and the coded chroma signal or between the input image and the decoded chroma signal. Especially as to the chroma signal, even a slight difference in value causes apparent color distortion in the subjective image quality.

In order to solve the above problem, the image coding method in an aspect according to the present invention is a method of coding an input block included in an image. To be more specific, the image coding method includes: generating a predicted block by predicting the input block; calculating a residual block by subtracting the predicted block from the input block; calculating quantized coefficients by performing transform and quantization on the residual block; calculating a coded residual block by performing inverse quantization and inverse transform on the quantized coefficients; generating a temporary coded block by adding the coded residual block to the predicted block; determining whether or not an offset process for correcting an error included in the temporary coded block is required, to generate first flag information indicating a result of the determination, the error being caused by the quantization in the calculating of quantized coefficients; executing the offset process on the temporary coded block when it is determined in the determining that the offset process is required; and performing variable-length coding on the quantized coefficients and the first flag information.

With this configuration, an error (a quantization error) caused by quantization can be reduced. More specifically, the image quality can be effectively prevented from deteriorating.

Moreover, the offset process may be executed to add an offset value to a value of a pixel included in the temporary coded block. In the determining, whether an offset value for a previously-coded block adjacent to the input block or the offset value newly calculated for the temporary coded block is used in the offset process to be executed on the temporary coded block may be further determined to generate second flag information indicating a result of the determination. In the executing, the offset process may be executed on the temporary coded block using the offset value indicated by the second flag information. In the performing, variable-length coding may be further performed on the second flag information.

Furthermore, in the executing, the offset process may be executed selectively on a pixel (i) that is one of pixels included in the temporary coded block and (ii) that corresponds to a pixel included in the input block and having a value included in a predetermined range where subjective color distortion is apparent.

Moreover, in the determining, when each of values of all pixels included in the input block is outside the predetermined range, it may be determined that the offset process is not required to be executed on the temporary coded block that corresponds to the input block.

As an example, each of the values of the pixels included in the input block may be expressed in a YUV format.

Furthermore, the image coding method may (i) switch between a coding process based on a first standard and a coding process based on a second standard, (ii) perform the determining, the executing, and the performing, as the coding process based on the first standard, and (iii) code an identifier indicating a standard of a coding process.

The image decoding method in an aspect according to the present invention is a method of decoding a bitstream to generate a decoded block. To be more specific, the image decoding method includes: obtaining quantized coefficients and first flag information that indicates whether or not an offset process is required, by performing variable-length decoding on the bitstream; obtaining a decoded residual block by performing inverse quantization and inverse transform on the quantized coefficients; generating a predicted block by predicting the decoded block; generating a temporary decoded block by adding the decoded residual block to the predicted block; and generating the decoded block by executing, on the temporary decoded block, the offset process for correcting an error that is caused by quantization and is included in the temporary decoded block, when the first flag information indicates that the offset process is required.

Moreover, the offset process may be executed to add an offset value to a value of a pixel included in the temporary decoded block. In the obtaining of quantized coefficients and first flag information, second flag information may be further obtained, the second flag information indicating whether the offset value for a previously-decoded block adjacent to the decoded block or the offset value newly calculated for the temporary decoded block is used in the offset process to be executed on the temporary decoded block. In the generating of the decoded block, the offset process may be executed on the temporary decoded block using the offset value indicated by the second flag information.

As an example, each of values of pixels included in the decoded block may be expressed in a YUV format.

Furthermore, the image decoding method may (i) switch between a decoding process based on a first standard and a decoding process based on a second standard, according to an identifier that is included in the bitstream and indicates the first standard or the second standard and (ii) perform, as the decoding process based on the first standard, the performing and the executing when the identifier indicates the first standard.

The image coding apparatus in an aspect according to the present invention codes an input block included in an image. To be more specific, the image coding apparatus includes: a prediction unit which generates a predicted block by predicting the input block; a calculation unit which calculates a residual block by subtracting the predicted block from the input block; a transform-quantization unit which calculates quantized coefficients by performing transform and quantization on the residual block; an inverse quantization-transform unit which calculates a coded residual block by performing inverse quantization and inverse transform on the quantized coefficients; a generation unit which generates a temporary coded block by adding the coded residual block to the predicted block; a determination unit which determines whether or not an offset process for correcting an error included in the temporary coded block is required, to generate first flag information indicating a result of the determination, the error being caused by the quantization performed by the transform-quantization unit; an offset processing unit which executes the offset process on the temporary coded block when it is determined by the determination unit that the offset process is required; and a variable-length coding unit which performs variable-length coding on the quantized coefficients and the first flag information.

The image decoding apparatus in an aspect according to the present invention decodes a bitstream to generate a decoded block. To be more specific, the image decoding apparatus includes: a variable-length decoding unit which obtains quantized coefficients and first flag information that indicates whether or not an offset process is required, by performing variable-length decoding on the bitstream; an obtainment unit which obtains a decoded residual block by performing inverse quantization and inverse transform on the quantized coefficients; a prediction unit which generates a predicted block by predicting the decoded block; a generation unit which generates a temporary decoded block by adding the decoded residual block to the predicted block; and an offset processing unit which generates the decoded block by executing, on the temporary decoded block, the offset process for correcting an error that is caused by quantization and is included in the temporary decoded block, when the first flag information indicates that the offset process is required.

The image coding-decoding apparatus in an aspect according to the present invention includes: the image coding apparatus described above; and the image decoding apparatus described above.

It should be noted that a general or specific embodiment in an aspect may be implemented by a system, a method, an integrated circuit, a computer program, or a recording medium, or by any combination of a system, a method, an integrated circuit, a computer program, and a recording medium.

The following is a description of embodiments according to the present invention, with reference to the drawings.

[Image Coding Apparatus]

FIG. 1 is a block diagram showing an example of a configuration of an image coding apparatus 200 in Embodiments 1 to 3 according to the present invention.

The image coding apparatus 200 performs compression coding on image data. For example, the image coding apparatus 200 receives, as an input signal, the image data for each block. The image coding apparatus 200 generates a coded signal (i.e., a bitstream) by performing transform, quantization, and variable-length coding on the received input signal.

As shown in FIG. 1, the image coding apparatus 200 includes a subtracter 205, a transform-quantization unit 210, an entropy coding unit 220, an inverse quantization-transform unit 230, an adder 235, a deblocking filter 240, a memory 250, an intra prediction unit 260, a motion estimation unit 270, a motion compensation unit 280, and an intra/inter selection switch 290.

The subtracter 205 calculates a difference between the input signal (an input block) and the predicted signal (a predicted block). More specifically, the subtracter 205 calculates a prediction residual error (a residual block).

The transform-quantization unit 210 generates transform coefficients in the frequency domain by transforming the prediction residual error in the space domain. For example, the transform-quantization unit 210 generates the transform coefficients by performing DCT (Discrete Cosine Transform) on the prediction residual error. Moreover, the transform-quantization unit 210 generates quantized coefficients by quantizing the transform coefficients.

The entropy coding unit 220 generates a coded signal by performing variable-length coding on the quantized coefficients. Moreover, the entropy coding unit 220 codes motion data (such as a motion vector) estimated by the motion estimation unit 270, first flag information and second flag information (described later), an offset value (described later), and so forth. Then, the entropy coding unit 220 includes these coded data pieces into the coded signal and outputs this coded signal.

The inverse quantization-transform unit 230 restores the transform coefficients by performing inverse quantization on the quantized coefficients. Moreover, the inverse quantization-transform unit 230 restores the prediction residual error by performing inverse transform on the restored transform coefficients. It should be noted that since the information on the restored prediction residual error has been lost by quantization, the restored prediction residual error does not agree with the prediction residual error generated by the subtracter 205. To be more specific, the restored prediction residual error includes a quantization error.

The adder 235 generates a local decoded image (a coded block) by adding the restored prediction residual error to the predicted signal.

The deblocking filter 240 performs deblocking filtering on the generated local decoded image.

The memory 250 stores a reference image to be used for motion compensation. To be more specific, the memory 250 stores the local decoded image on which deblocking filtering has been performed.

The intra prediction unit 260 generates a predicted signal (an intra-predicted signal) by performing intra prediction. More specifically, the intra prediction unit 260 generates the intra-predicted signal by performing intra prediction, with reference to an image located near a current block (the input signal) that is to be coded and is included in the local decoded image generated by the adder 235.

The motion estimation unit 270 estimates motion data (such as a motion vector) between the input signal and the reference image stored in the memory 250.

The motion compensation unit 280 generates a predicted signal (an inter-predicted signal) by performing motion compensation based on the estimated motion data.

The intra/inter selection switch 290 selects one of the intra-predicted signal and the inter-predicted signal, and outputs the selected signal as the predicted signal to the subtracter 205 and the adder 235.

With the configuration described thus far, the image coding apparatus 200 in Embodiments 1 to 3 according to the present invention performs compression coding on the image data.

Embodiment 1

An image coding method in Embodiment 1 includes: generating a predicted block by predicting the input block; calculating a residual block by subtracting the predicted block from the input block; calculating quantized coefficients by performing transform and quantization on the residual block; calculating a coded residual block by performing inverse quantization and inverse transform on the quantized coefficients; generating a temporary coded block by adding the coded residual block to the predicted block; executing an offset process on the temporary coded block; and performing variable-length coding on the quantized coefficients.

Note that the offset process refers to a process performed to correct an error that is caused by quantization in the calculating of quantized coefficients and is included in the temporary coded block. To be more specific, the offset process is executed to add an offset value to a value of a pixel included in the temporary coded block. Here, although each of values of pixels included in the input block is not particularly limited, the following description is based on the assumption that each of the values of the pixels is expressed in the YUV format. Moreover, although the following describes an example where a predicted block is generated by intra prediction, the present invention is not limited to this. The predicted block may be generated by, for example, inter prediction.

Figure 4:
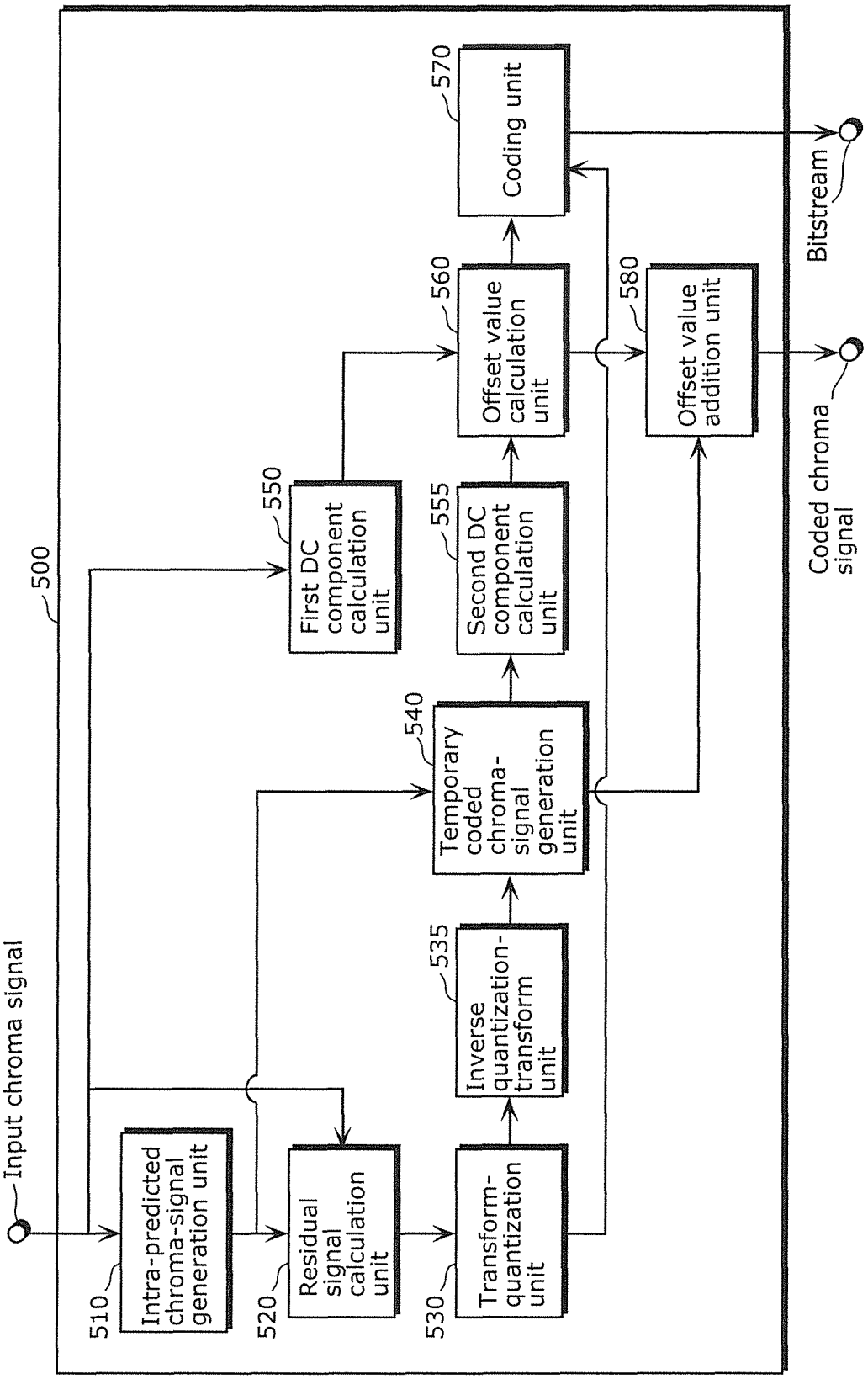
FIG. 4 is a block diagram showing an example of chroma-signal intra prediction in Embodiment 1 according to the present invention.

The following describes a configuration of an image processing apparatus (a chroma-signal intra prediction unit) 500 that executes an intra prediction method in the offset process executed on the chroma signal in Embodiment 1. FIG. 4 is a block diagram showing an example of the configuration of the image processing apparatus 500 in Embodiment 1 according to the present invention. It should be noted that, as described later, the image processing apparatus 500 in Embodiment 1 according to the present invention corresponds to a part of the image coding apparatus 200 that performs compression coding on an image signal and outputs coded image data.

As shown in FIG. 4, the image processing apparatus 500 includes an intra-predicted chroma-signal generation unit 510, a residual signal calculation unit 520, a transform-quantization unit 530, an inverse quantization-transform unit 535, a temporary coded chroma-signal generation unit 540, a first DC component calculation unit 550, a second DC component calculation unit 555, an offset value calculation unit 560, a coding unit 570, and an offset value addition unit 580.

Figure 5:
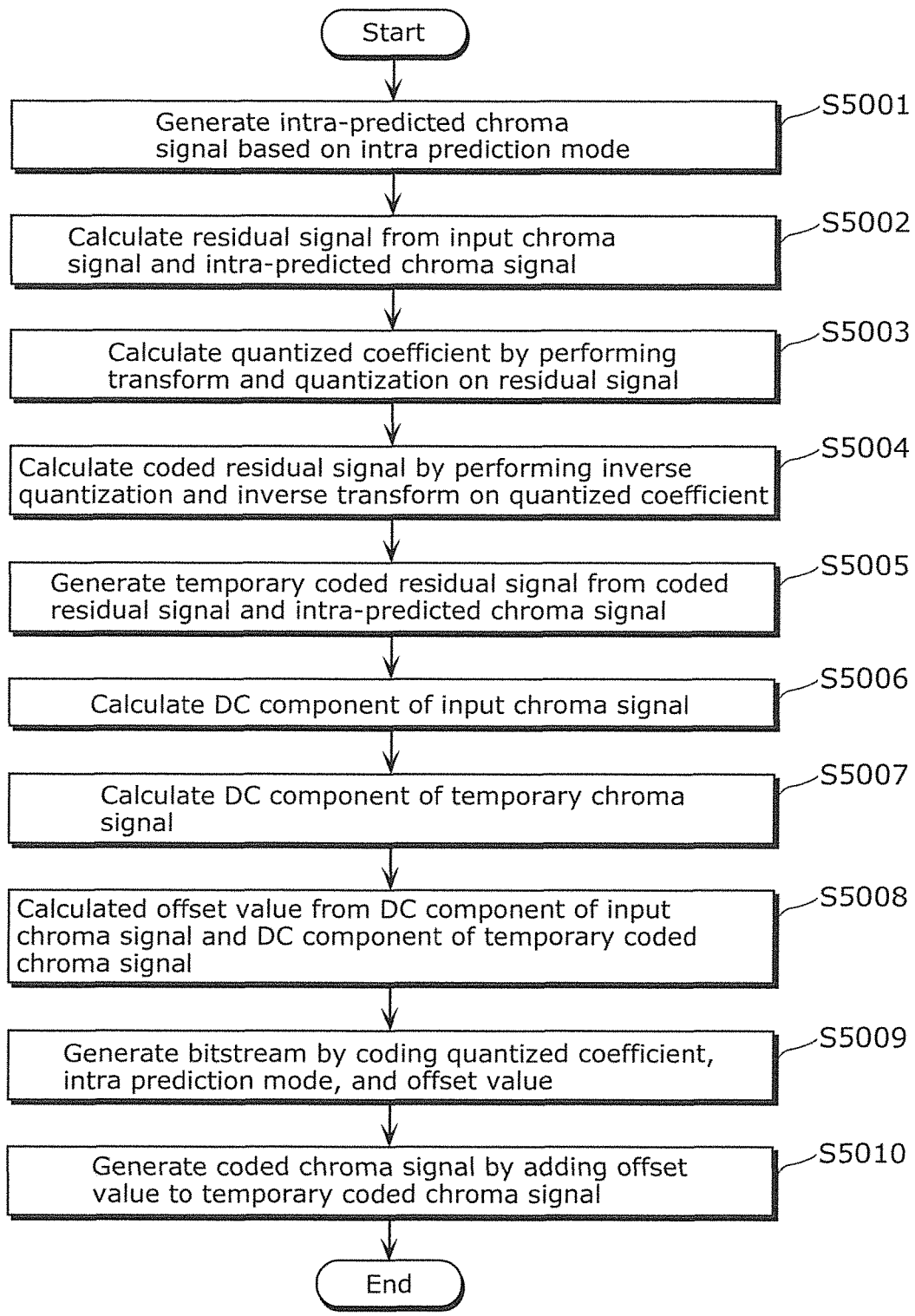
FIG. 5 is a flowchart showing an example of chroma-signal intra prediction in Embodiment 1 according to the present invention.

An operation performed by the image processing apparatus 500 in Embodiment 1 according to the present invention is described in more detail, with reference to FIG. 5. FIG. 5 is a flowchart showing a process performed by the image processing apparatus 500.

Firstly, the intra-predicted chroma-signal generation unit 510 generates an intra-predicted chroma signal based on an intra prediction mode, and outputs the generated signal to the residual signal calculation unit 520 and the temporary coded chroma-signal generation unit 540 (Step S5001). The intra-predicted chroma signal is generated according to the intra prediction mode using, as appropriate, a coded luma signal of a neighboring block, a coded chroma signal of a neighboring block, and a coded luma signal of the current block to be processed.

Next, the residual signal calculation unit 520 calculates a residual signal from an input chroma signal and the intra-predicted chroma signal, and outputs the residual signal to the transform-quantization unit 530 (Step S5002). The residual signal is obtained by calculating a difference between the input chroma signal and the intra-predicted chroma signal.

Next, the transform-quantization unit 530 calculates quantized coefficients by performing transform and quantization on the residual signal, and outputs the quantized coefficients to the inverse quantization-transform unit 535 and the coding unit 570 (Step S5003). By quantization, the coefficient value in the frequency domain obtained by transforming the residual signal is approximated more roughly. Here, when the QP is greater, rougher approximation is performed, meaning that an error is greater between the original input chroma signal and the temporary coded chroma signal described later.

Next, the inverse quantization-transform unit 535 calculates a coded residual signal by performing inverse quantization and inverse transform on the quantized coefficients, and outputs the coded residual signal to the temporary coded chroma-signal generation unit 540 (Step S5004). Inverse quantization and inverse transform are performed by a procedure exactly opposite to the procedure in Step S5003.

After this, the temporary coded chroma-signal generation unit 540 generates a temporary coded chroma signal from the coded residual signal and the intra-predicted chroma signal, and outputs the generated signal to the second DC component calculation unit 555 and the offset value addition unit 580 (Step S5005). The temporary coded chroma signal is calculated by adding the coded residual signal to the intra-predicted chroma signal.

Next, the first DC component calculation unit 550 calculates a DC component of the input chroma signal and outputs the calculated DC component to the offset value calculation unit 560 (Step S5006). Here, the DC component refers to an average value of a signal waveform, and is obtained by, for example, calculating an average value of pixels of the input signal (i.e., a plurality of pixels included in the current block to be coded). Alternatively, a DC component obtained by performing frequency transform on the input chroma signal may be used as the DC component of the input chroma signal.

Then, the second DC component calculation unit 555 calculates a DC component of the temporary coded chroma signal, and outputs the calculated DC component to the offset value calculation unit 560 (Step S5007). Here, the DC component is calculated by the same method as used in Step S5006.

Next, the offset value calculation unit 560 calculates an offset value from the DC component of the input chroma signal and the DC component of the temporary coded chroma signal, and outputs the calculated offset value to the coding unit 570 and the offset value calculation unit 580 (Step S5008). A specific method of calculating the offset value is described later.

Then, the coding unit 570 generates a bitstream by coding the quantized coefficients, the intra prediction mode, and the offset value (Step S5009).

Next, the offset value addition unit 580 generates a coded chroma signal by adding the offset value to the temporary coded chroma signal (Step S5010). The coded chroma signal obtained by the addition performed by the offset value addition unit 580 is stored into a memory, which is not illustrated, to be used in a later intra prediction process for example.

The process from Step S5001 to Step S5010 as described is repeated for each of the blocks included in the image.

Here, the offset value is explained. The offset value of the DC component of the input chroma signal and the DC component of the temporary coded chroma signal is calculated according to Equation 1, for example.

[Math. 1]

$$\text{tmp\_offset} = \text{average}(\text{Input}C) - \text{average}(\text{tmpRec}C) \quad \text{Equation 1}$$

Equation 1 shows an example where an average value of pixels of the chroma signal is used as the DC component. Here, "InputC" represents an input chroma signal block, and "tmpRecC" represents a temporary coded chroma signal. Moreover, "average( )" represents a function used for calculating the average of signal values of the input block. An offset value "tmp_offset" is calculated with sub-pixel accuracy according to Equation 1 and, therefore, the coded chroma signal can be restored with high accuracy by using this offset value. However, the number of bits of the coded bitstream increases. Thus, in order to reduce the amount of information, a quantization process or a clipping process is performed on the offset value as expressed by Equation 2.

[Math. 2]

$$\text{offset} = \text{Clip}(\text{Disc}(\text{tmp\_offset})) \quad \text{Equation 2}$$

Figure 6:
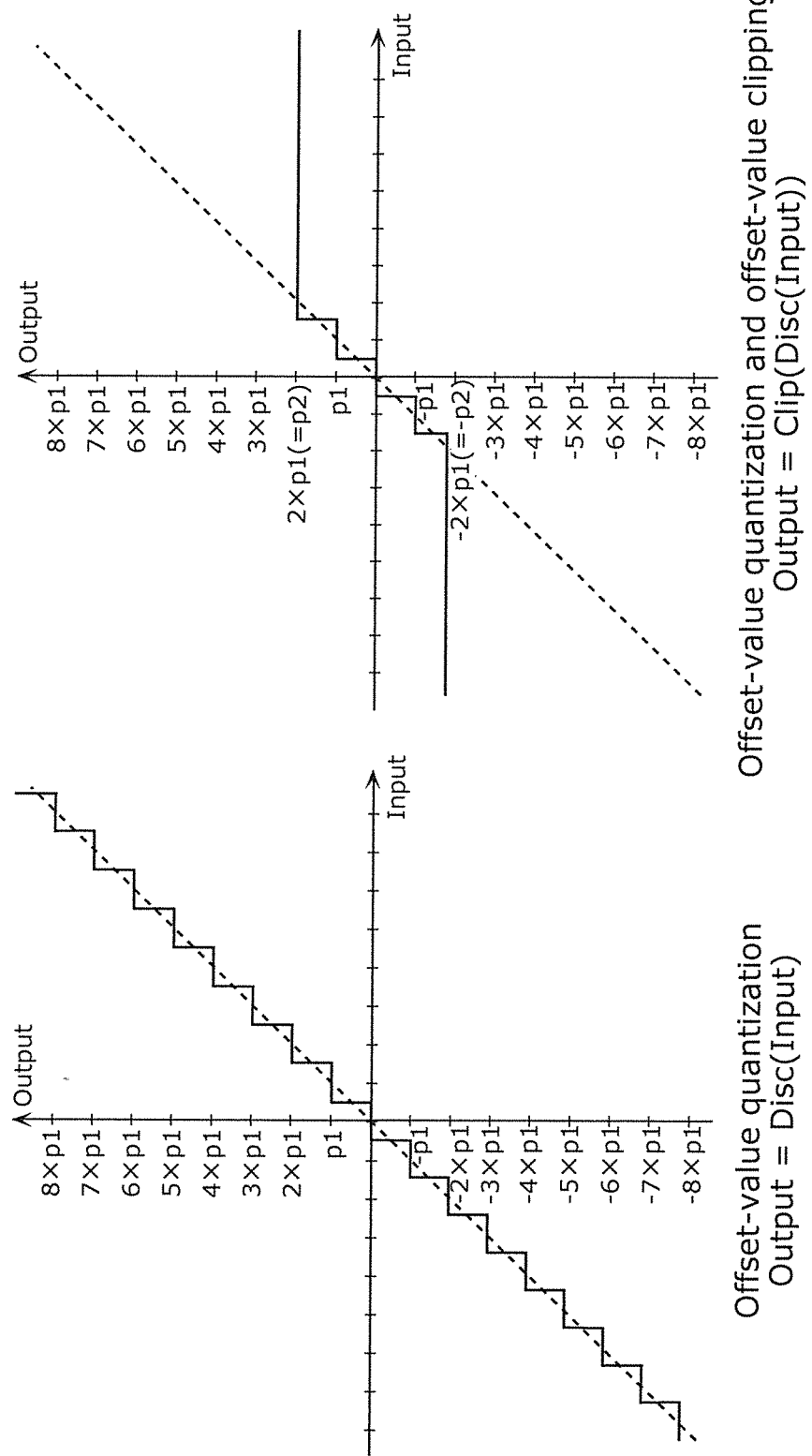
FIG. 6 is a schematic diagram showing an example of calculation of a chroma-signal intra prediction value, in Embodiment 1 according to the present invention.

Here, "offset" represents an output value of the offset value calculation unit 560, that is, an offset value that is calculated with integer-pixel accuracy and is actually added to the temporary coded chroma signal. Moreover, "Disc ( )" represents a function used for quantizing the offset value tmp_offset having sub-pixel accuracy into an integral multiple of a parameter p1. Furthermore, "Clip ( )" represents a process of rounding a value outside a specified range to a maximum value or a minimum value using a parameter p2. FIG. 6 shows examples of the quantization process and the clipping process performed on the offset value.

Here, each of the parameters p1 and p2 is an integer value. Each of the parameters p1 and p2 is determined according to, for example, limitation on the number of bits of the coded signal, manual setting based on the subjective image quality of the coded image, a relationship with the quantized coefficients, and statistical data on a difference value between the input chroma signal and the temporary coded chroma signal.

With this, the error between the input chroma signal and the coded chroma signal (that is, the error caused by quantization=the quantization error) can be reduced. Moreover, color distortion of the coded chroma signal can be suppressed.

It should be noted that the coded chroma signal may be used in chroma-signal intra prediction, luma signal intra prediction, chroma-signal inter-frame prediction, or luma signal inter-frame prediction for a block to be processed later. With this, the prediction accuracy can be further improved and the high coding efficiency can be thus implemented.

It should be noted that only one of the first DC component calculation unit 550 and the second DC component calculation unit 555 may be used commonly in calculating the DC component of the input chroma signal and the DC component of the temporary coded chroma signal. This allows the image processing apparatus 500 to be implemented with a smaller circuit size.

It should be noted that the aforementioned offset process may also be performed on the luma signal in the same way. As a result, a coded image signal closer in luma to the input signal can be obtained as well.

Embodiment 2

An image coding method in Embodiment 2 further includes: determining whether or not an offset process for correcting an error included in a temporary coded block is required, to generate first flag information indicating a result of the determination, the error being caused by the quantization in the calculating of quantized coefficients. In the executing of the offset process, when it is determined in the determining that the offset process is required, the offset process is executed on the temporary coded block. Moreover, in the performing of variable-length coding, variable-length coding is performed on the first flag information.

Next, an operation performed by an image processing apparatus (a chroma-signal intra prediction unit) 600 in Embodiment 2 according to the present invention is described.

Figure 7:
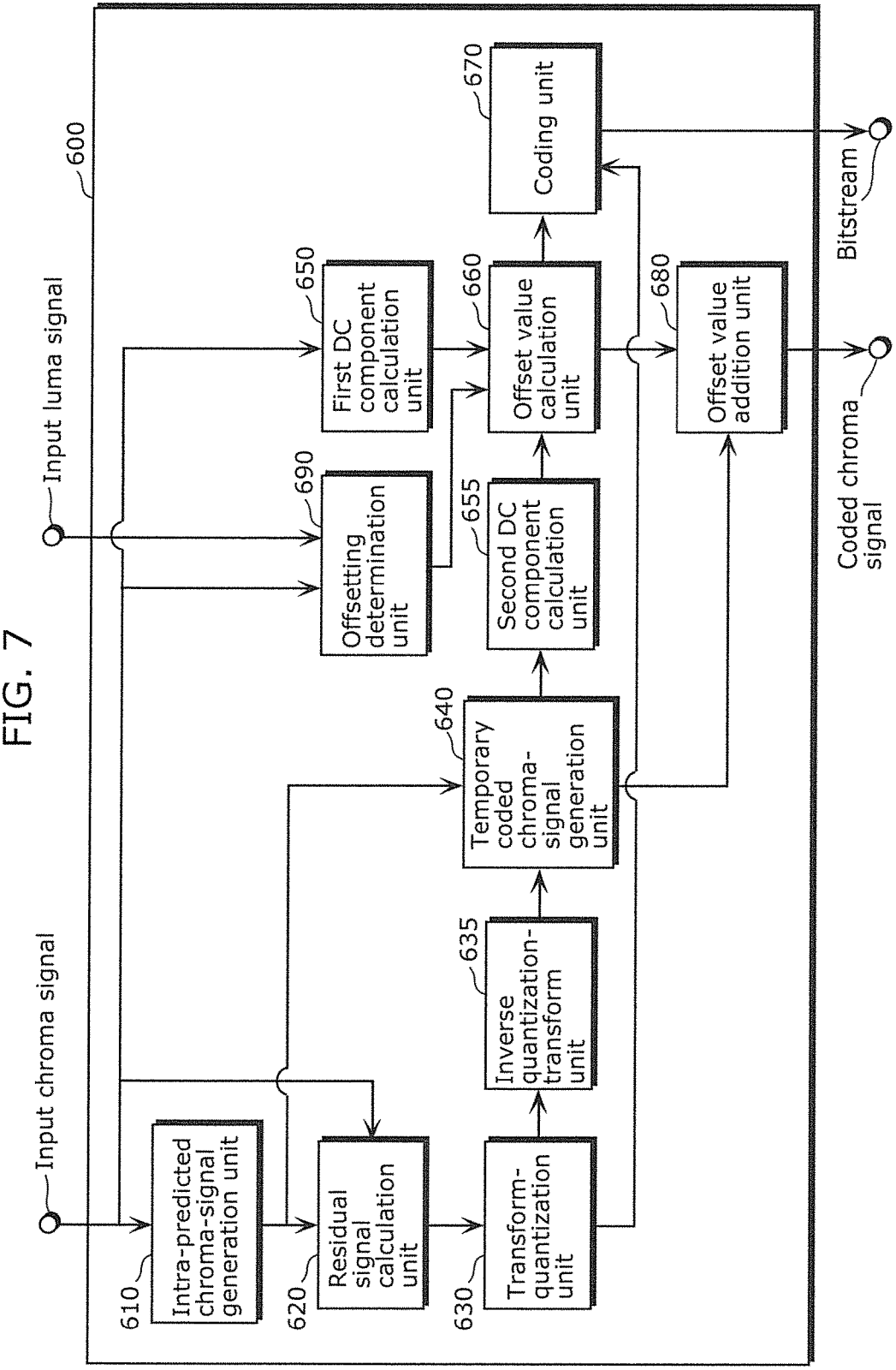
FIG. 7 is a block diagram showing an example of chroma-signal intra prediction in Embodiment 2 according to the present invention.

FIG. 7 is a block diagram showing a configuration of the image processing apparatus 600 in Embodiment 2.

As shown in FIG. 7, the image processing apparatus 600 includes an intra-predicted chroma-signal generation unit 610, a residual signal calculation unit 620, a transform-quantization unit 630, an inverse quantization-transform unit 635, a temporary coded chroma-signal generation unit 640, a first DC component calculation unit 650, a second DC component calculation unit 655, an offset value calculation unit 660, a coding unit 670, an offset value addition unit 680, and an offsetting determination unit 690. More specifically, as compared with the image processing apparatus 500 shown in FIG. 4, the image processing apparatus 600 shown in FIG. 7 additionally includes the offsetting determination unit 690. The other components of the image processing unit 600 are identical to the corresponding components of the image processing apparatus 500 and, therefore, detailed explanations of these components are not repeated here.

The descriptions of the components that are included in the image processing apparatus 600 and identical to the corresponding components included in the image processing apparatus 500 in Embodiment 1 are omitted. Thus, the offsetting determination unit 690 that is a difference between the image processing apparatus 600 and the image processing apparatus 500 is described. To be more specific, in Embodiment 2, whether or not the offset process is required is determined for each block and the offset value is calculated only for the block where the offset process is determined to be required.

Figure 8:
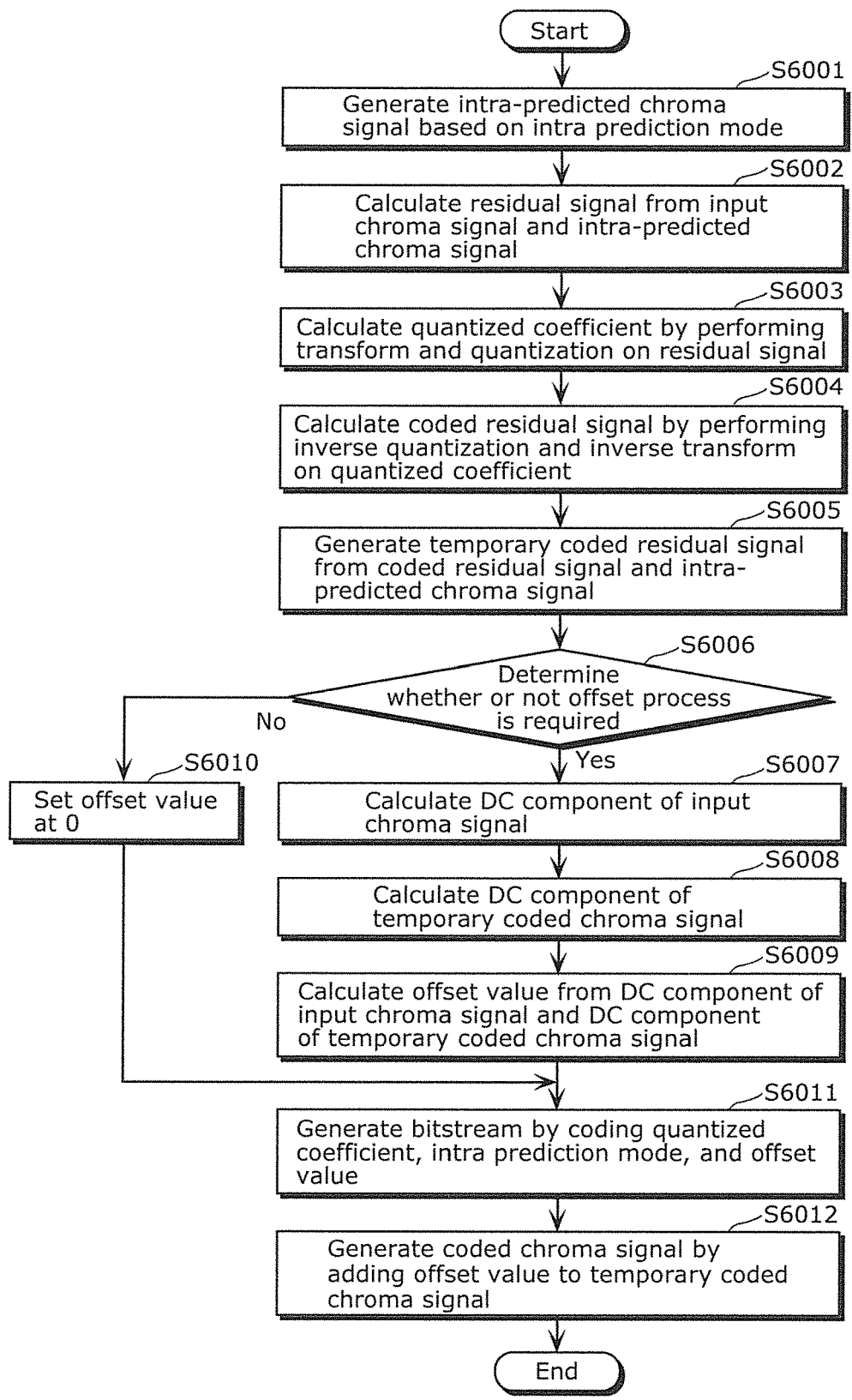
FIG. 8 is a flowchart showing an example of chroma-signal intra prediction in Embodiment 2 according to the present invention.

Next, chroma-signal intra prediction performed by the image processing apparatus 600 is described. FIG. 8 is a flowchart showing chroma-signal intra prediction according to the image coding method in Embodiment 2. Detailed explanations on processes shown in FIG. 8 that are identical to the corresponding processes explained in Embodiment 1 with reference to FIG. 5 are not repeated here. Thus, Steps S6006 to S6010 in FIG. 8 are mainly described.

In Step S6006, the offsetting determination unit 690 determines whether or not the offset process is required in the current block to be processed. For this determination, the input chroma signal and the input luma signal are used for example. Color distortion caused by an error between the input chroma signal and the coded chroma signal depends on the values of the chroma signal and the luma signal. More specifically, even with the same error value, the color distortion appears differently in the subjective image quality according to the values of the chroma signal and luma signal. On account of this, the offset process is determined to be required when the input signal exists in a range (may also be referred to as "the range A" hereafter) where color distortion in the subjective image quality is apparent in the chroma space and the luma space.

A data structure of the range A may be expressed based on the maximum value and the minimum value for each component of YUV and RGB, or based on a color map having three axes corresponding to YUV or RGB. Moreover, the input signal used for the determination may be, for example, average values of the input chroma signal and the input luma signal in the current block, DC components obtained by frequency transforms performed on the input chroma signal and the input luma signal, or median values of the input chroma signal and the input luma signal.

It should be noted that only the value in the chroma space may be used in the determination as to whether or not the offset process is required in the current block. With this, the amount of calculation required of the offsetting determination unit 690 and the circuit size can be suppressed.

To be more specific, in the executing of the offset process, the offset process may be executed selectively on a pixel: that is one of pixels included in the temporary coded block; and that corresponds to a pixel included in the input block and having a value included in a predetermined range where subjective color distortion is apparent. Moreover, in the determining, when each of values of all pixels included in the input block is outside the predetermined range, it may be determined that the offset process is not required to be executed on the temporary coded block that corresponds to the input block.

When the offset process is determined to be required in Step S6006, the offset value is calculated in Steps S6007 to S6009 in the same way as in Embodiment 1.

On the other hand, when the offset process is determined not to be required in Step S6006, the offset value is set at a value to which the coding unit 670 assigns the minimum number of bits. With this, information indicating whether or not the offset process is required does not need to be coded, and the determination as to whether or not the offset process is required can be made with the minimum number of bits. Thus, the number of bits of the bitstream can be suppressed, and color distortion of the coded chroma signal can also be suppressed. Note that the information indicating whether or not the offset process is required (i.e., the first flag information) may be included in the bitstream separately from the offset value.

When the offset process is determined not to be required in Step S6006, the information indicating whether or not the offset process is required (i.e., the first flag information) may be coded. In this case, the process of adding the offset value in Step S6012 is not performed and, therefore, an increase in the amount of calculation can be suppressed.

It should be noted that, in Step S6006, whether or not the offset process is required may be determined using the temporary coded chroma signal. The decoding apparatus side can also generate the same signal as the temporary coded chroma signal and thus can determine whether or not the offset process is required. On this account, the first flag information does not need to be included in the bitstream, and only the offset value may be coded only when the offset process is required. More specifically, when the offset process is not required, the information related to the offset process is not coded. This can further suppress the number of bits of the bitstream.

It should be noted that the aforementioned offset process may also be performed on the luma signal in the same way. As a result, a coded image signal closer in luma to the input signal can be obtained as well.

Embodiment 3

According to an image coding method in Embodiment 3, the following process is further executed. More specifically, in the determining, whether an offset value for a previously-coded block adjacent to the input block or the offset value newly calculated for the temporary coded block is used in the offset process to be executed on the temporary coded block is further determined (i.e., whether the offset value needs to be updated is determined) to generate second flag information indicating a result of the determination. In the executing, the offset process is executed on the temporary coded block using the offset value indicated by the second flag information. In the performing, variable-length coding is further performed on the second flag information, and also on the new offset value when the offset value is updated.

Next, an operation performed by an image processing apparatus (a chroma-signal intra prediction unit) 700 in Embodiment 3 according to the present invention is described.

Figure 9:
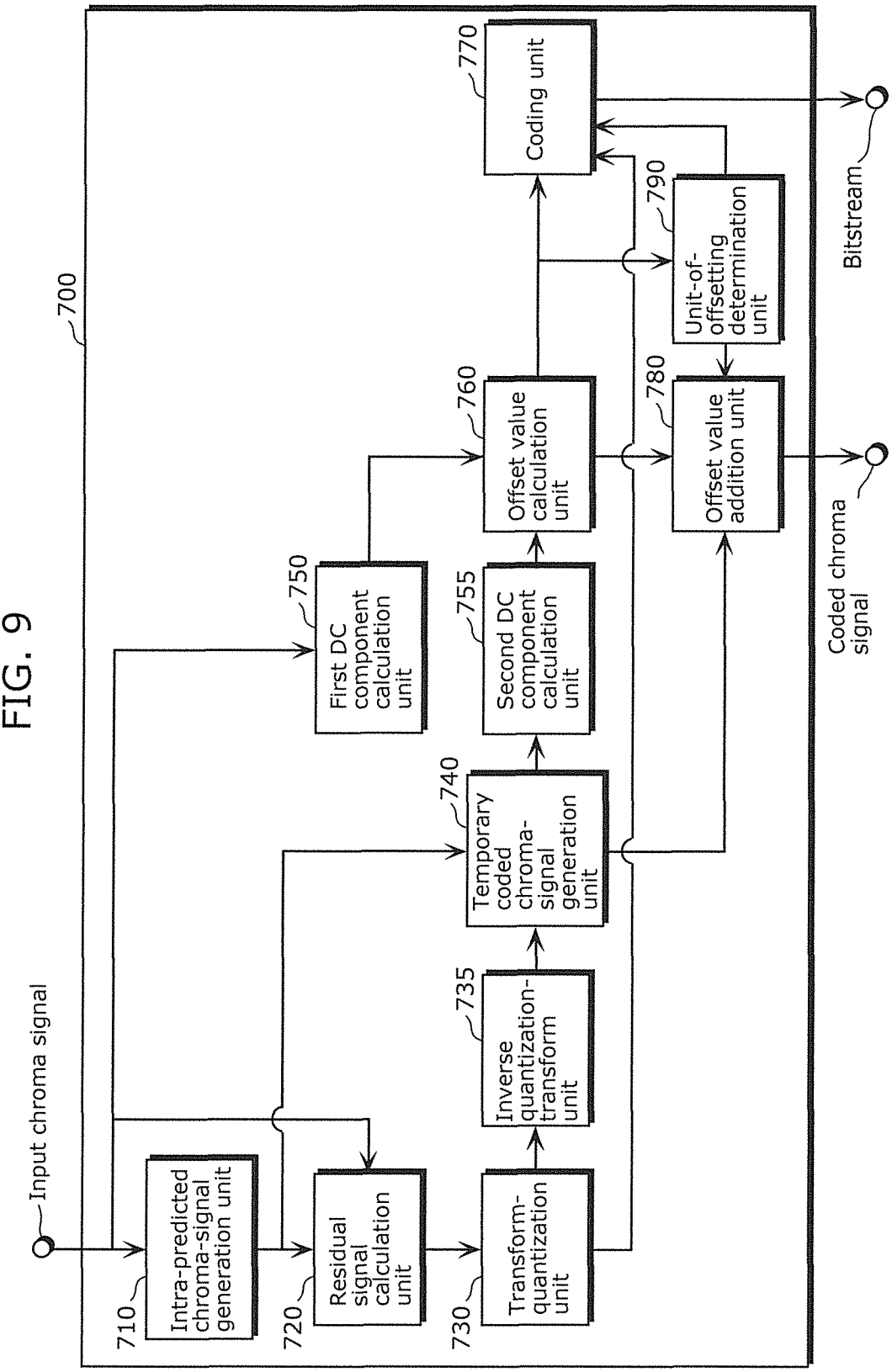
FIG. 9 is a block diagram showing an example of chroma-signal intra prediction in Embodiment 3 according to the present invention.

FIG. 9 is a block diagram showing a configuration of the image processing apparatus 700 in Embodiment 3.

As shown in FIG. 9, the image processing apparatus 700 includes an intra-predicted chroma-signal generation unit 710, a residual signal calculation unit 720, a transform-quantization unit 730, an inverse quantization-transform unit 735, a temporary coded chroma-signal generation unit 740, a first DC component calculation unit 750, a second DC component calculation unit 755, an offset value calculation unit 760, a coding unit 770, an offset value addition unit 780, and a unit-of-offsetting determination unit 790. More specifically, as compared with the image processing apparatus 500 shown in FIG. 4, the image processing apparatus 700 shown in FIG. 9 additionally includes the unit-of-offsetting determination unit 790. The other components of the image processing unit 700 are identical to the corresponding components of the image processing apparatus 500 and, therefore, detailed explanations of these components are not repeated here.

The descriptions of the components that are included in the image processing apparatus 700 and identical to the corresponding components included in the image processing apparatus 500 in Embodiment 1 are omitted. Thus, the unit-of-offsetting determination unit 790 that is a difference between the image processing apparatus 700 and the image processing apparatus 500 is described. The image processing apparatus 700 in Embodiment 3 allows the offset process to be performed on a plurality of neighboring blocks using the same offset value.

Figure 10:
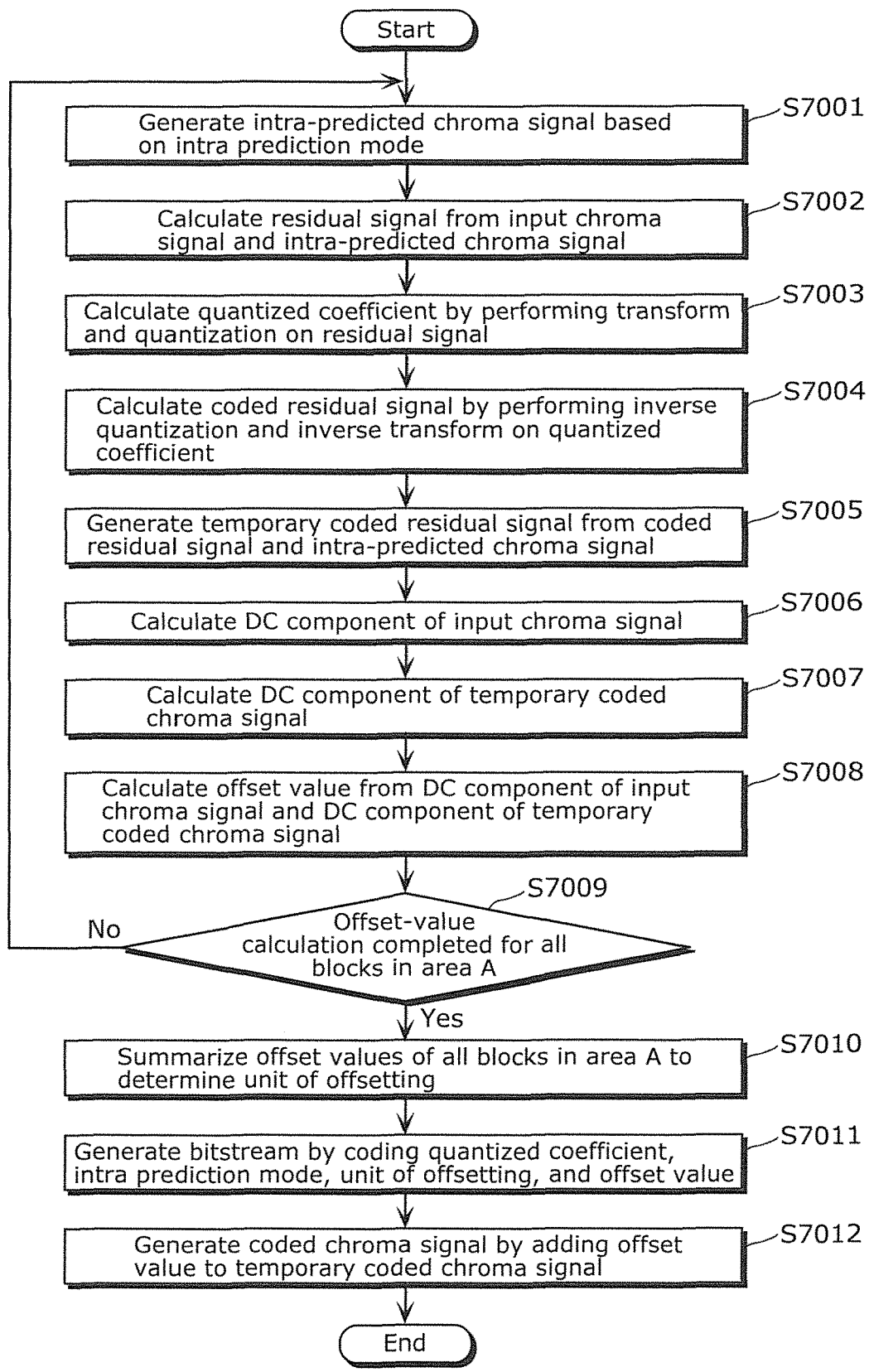
FIG. 10 is a flowchart showing an example of chroma-signal intra prediction in Embodiment 3 according to the present invention.

Next, chroma-signal intra prediction performed by the image processing apparatus 700 is described. FIG. 10 is a flowchart showing chroma-signal intra prediction according to the image coding method in Embodiment 3. Detailed explanations on processes that are identical to the corresponding processes explained in Embodiment 1 with reference to FIG. 5 are not repeated here. Thus, Steps S7009 to S7012 in FIG. 10 are mainly described.

In Step S7009, the unit-of-offsetting determination unit 790 determines whether or not calculation of the offset value is completed for all blocks existing in an area including the blocks (also referred to as "the area A" hereafter). When calculation of the offset value is not completed for all the blocks (No in S7009), the image processing apparatus 700 stores the offset value calculated in Step S7008, and repeats Steps S7001 to S7008. Then, when calculation of the offset value is completed for all the blocks (Yes in S7009), the image processing apparatus 700 proceeds to Step S7010.

Next, in Step S7010, the unit-of-offsetting determination unit 790 summarizes the offset values of all the blocks in the area A that are calculated according to Steps up to S7009, to determine a unit of the offset process. Then, the unit-of-offsetting determination unit 790 outputs a result of the determination to the coding unit 770 and the offset value addition unit 780.

After this, in Step S7011, the coding unit 770 generates a bitstream by coding the quantized coefficients, the intra prediction mode, the unit of the offset process (second flag information), and the offset value.

Next, in Step S7012, the offset value addition unit 780 adds the offset value to the temporary coded chroma signal to generate a coded chroma signal. The coded chroma signal generated by the offset addition unit 780 is stored into a memory, which is not illustrated, to be used in a later intra prediction process for example.

Here, as an example, determination of a unit of the offset process is described. Firstly, an evaluation formula represented by Equation 3 is calculated for each of the offset values.

[Math. 3]

$$Eval(k) = \sum_{i=1}^{N} (jdg1(i) \times sBlk(i)) / \sum_{i=1}^{N} sBlk(i) \quad \text{Equation 3}$$

Here, "k" represents the offset value to be evaluated, "N" represents the number of blocks existing in the area A, and "sBlk (i)" represents the size of an i-th block in the area A. Moreover, "jdg1 (i)" represents a function used for determining whether or not the offset value of the i-th block in the area A is equal to "k", as expressed by Equation 4.

[Math. 4]

$$jdg1(i) = \begin{cases} 0, & \text{if } k \neq \text{offset} \\ 1, & \text{if } k = \text{offset} \end{cases} \quad \text{Equation 4}$$

Here, "Eval (k)" represents a proportion of pixels having the offset value "k" in the area A.

Next, as expressed by Equation 5, whether or not the maximum value of Eval (k) is greater than or equal to a given threshold "Th_oft" is determined using a function "jdg2".

[Math. 5]

$$jdg2 = \begin{cases} 0, & \text{if } \max(Eval(k)) < \text{Th\_oft} \\ 1, & \text{if } \max(Eval(k)) \geq \text{Th\_oft} \end{cases} \quad \text{Equation 5}$$

Figure 11A:
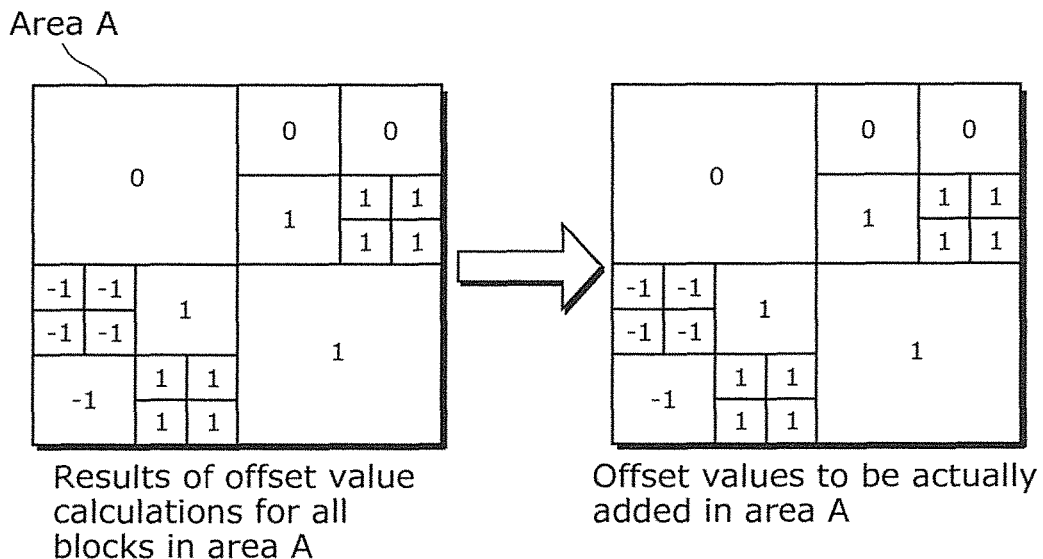
FIG. 11A is a schematic diagram showing an example of a unit of offsetting used for chroma-signal intra prediction and shows an example where a different offset value is used for each block, in Embodiment 3 according to the present invention.
Figure 11B:
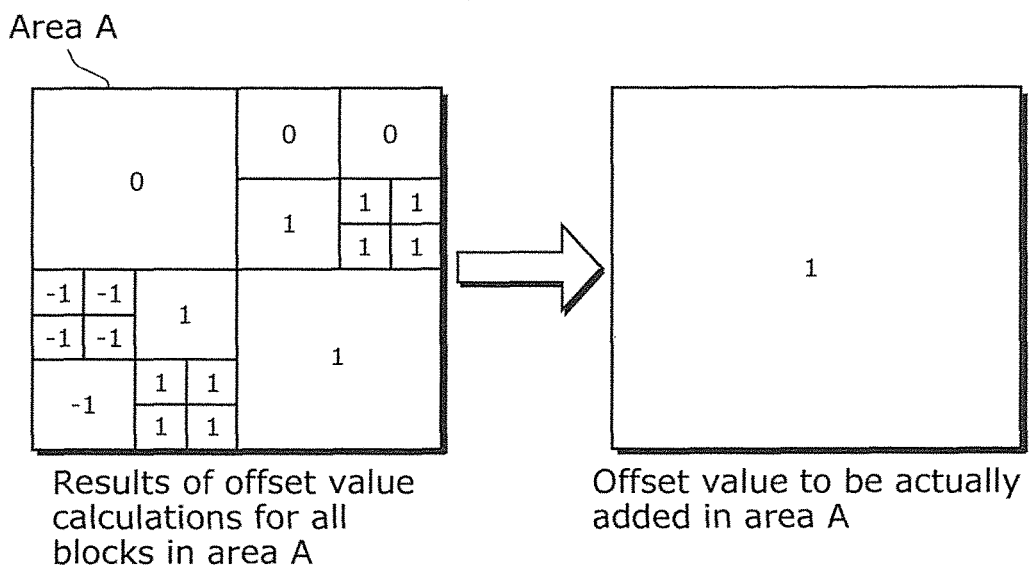
FIG. 11B is a schematic diagram showing an example of a unit of offsetting used for chroma-signal intra prediction and shows an example where the same offset value is used in an area A.

Each of FIG. 11A and FIG. 11B shows an example of the result when Th_oft=0.6. When jdg2=0, the unit-of-offsetting determination unit 790 determines that a predominant offset value does not exist in the area A and thus determines that the offset process is to be performed using a different offset value for each block as shown in FIG. 11A. On the other hand, when jdg2=1, the unit-of-offsetting determination unit 790 determines that a predominant offset value exists in the area A and thus determines that the offset process is to be performed on all the blocks using the same offset value as shown in FIG. 11B.

As a result, the offset values of an area larger than a block (such as an LCU) can be coded by one operation. This can suppress an increase in the number of bits of the coded signal and also suppress color distortion of the coded chroma signal.

It should be noted that the determination of the unit of the offset process may be made based on a comparison using a cost function as expressed by Equation 6.

[Math. 6]

$$\text{Cost} = \sum_{i=0}^{N} \text{diff}(\text{Input}(i), \text{oft Rec}(i)) + \lambda \times \sum_{i=0}^{N} \text{bits}(\text{oft Rec}(i)) \quad \text{Equation 6}$$

Here, "Input (i)" represents an i-th block in the area A of the input signal, and "oftRec (i)" represents an i-th block in the area A of the coded signal. Here, only the chroma signal or both the luma signal and the chroma signal may be used. Moreover, "diff (A, B)" represents a function that returns a difference value between a block A and a block B. The difference value is obtained by calculating an absolute error, for example. Furthermore, "bit (A)" is a function that returns the number of bits generated when the block A is coded. Moreover, "λ" represents a weighting parameter and is set according to, for example, the QP.

For example, the unit-of-offsetting determination unit 790 performs calculation according to Equation 6 for each of the cases: where the same offset value is used for all the blocks; and where a different offset value is used for each of the blocks. Then, by making a comparison as expressed by Equation 7, the unit-of-offsetting determination unit 790 determines the unit of the offset process.

[Math. 7]

$$jdg3 = \begin{cases} 0, & \text{if cost\_inv} < \text{cost\_all} \\ 1, & \text{if cost\_inv} \geq \text{cost\_all} \end{cases} \quad \text{Equation 7}$$

Here, "cost_inv" represents a cost value of Equation 6 in the case where a different offset value is used for each of the blocks, and "cost_all" represents a cost value of Equation 6 in the case where the same offset value is used for all the blocks of the area A. When jdg3=0, the unit-of-offsetting determination unit 790 determines that the offset process is to be performed using a different offset value for each of the blocks. On the other hand, when jdg3=1, the unit-of-offsetting determination unit 790 determines that the offset process is to be performed using the same offset value for all the blocks. As a result, coding can be performed, with the number of bits and the appearance of color distortion being in balance.

It should be noted that, as described in Embodiment 2, coding of the offset value may be performed only on a block where the offset process is required. To be more specific, when the offset process is not required, the offset value of this block is not coded. With this, the number of bits of the coded signal can be further suppressed.

It should be noted that the aforementioned offset process may also be performed on the luma signal in the same way. As a result, a coded image signal closer in luma to the input signal can be obtained as well.

[Image Decoding Apparatus]

FIG. 12 is a block diagram showing an example of a configuration of an image decoding apparatus 400 in Embodiments 4 to 6 according to the present invention.

The image decoding apparatus 400 decodes coded image data generated by compression coding. For example, the image decoding apparatus 400 receives the coded image data for each block, as a current signal to be decoded. The image decoding apparatus 400 restores the image data by performing variable-length decoding, inverse quantization, and inverse transform on the received current signal to be decoded.

As shown in FIG. 4, the image decoding apparatus 400 includes an entropy decoding unit 410, an inverse quantization-transform unit 420, an adder 425, a deblocking filter 430, a memory 440, an intra prediction unit 450, a motion compensation unit 460, and an intra/inter selection switch 470.

The entropy decoding unit 410 restores the quantized coefficients by performing variable-length decoding on an input signal (an input stream). Here, the input signal (the input stream) is a current signal to be decoded and corresponds to data of each block included in the coded image data. Moreover, the entropy decoding unit 410 obtains motion data from the input signal and outputs the obtained motion data to the motion compensation unit 460.

The inverse quantization-transform unit 420 restores the transform coefficients by performing inverse quantization on the quantized coefficients restored by the entropy decoding unit 410. Then, the inverse quantization-transform unit 420 restores the prediction residual error by performing inverse transform on the restored transform coefficients.

The adder 425 generates a decoded image by adding the prediction residual error restored by the inverse quantization-transform unit 420 to a predicted signal obtained from the intra/inter selection switch 470.

The deblocking filter 430 performs deblocking filtering on the decoded image generated by the adder 425. The decoded image on which deblocking filtering has been performed is outputted as a decoded signal.

The memory 440 stores a reference image to be used for motion compensation. To be more specific, the memory 440 stores the decoded image on which deblocking filtering has been performed by the deblocking filter 430.

The intra prediction unit 450 generates a predicted signal (an intra-predicted signal) by performing intra prediction. More specifically, the intra prediction unit 450 generates the intra-predicted signal, by performing intra prediction with reference to an image located near a current block that is to be decoded (the input signal) and is included in the decoded image generated by the adder 425.

The motion compensation unit 460 generates a predicted signal (an inter-predicted signal) by performing motion compensation based on the motion data outputted from the entropy decoding unit 410.

The intra/inter selection switch 470 selects one of the intra-predicted signal and the inter-predicted signal, and outputs the selected signal as the predicted signal to the adder 425.

With the configuration described thus far, the image decoding apparatus 400 in Embodiments 4 to 6 according to the present invention decodes the coded image data generated by compression coding.

Embodiment 4

An image decoding method in Embodiment 4 includes: obtaining quantized coefficients by performing variable-length decoding on the bitstream; obtaining a decoded residual block by performing inverse quantization and inverse transform on the quantized coefficients; generating a predicted block by predicting the decoded block; generating a temporary decoded block by adding the decoded residual block to the predicted block; and generating the decoded block by executing, on the temporary decoded block, the offset process for correcting an error that is caused by quantization and is included in the temporary decoded block.

Figure 15:
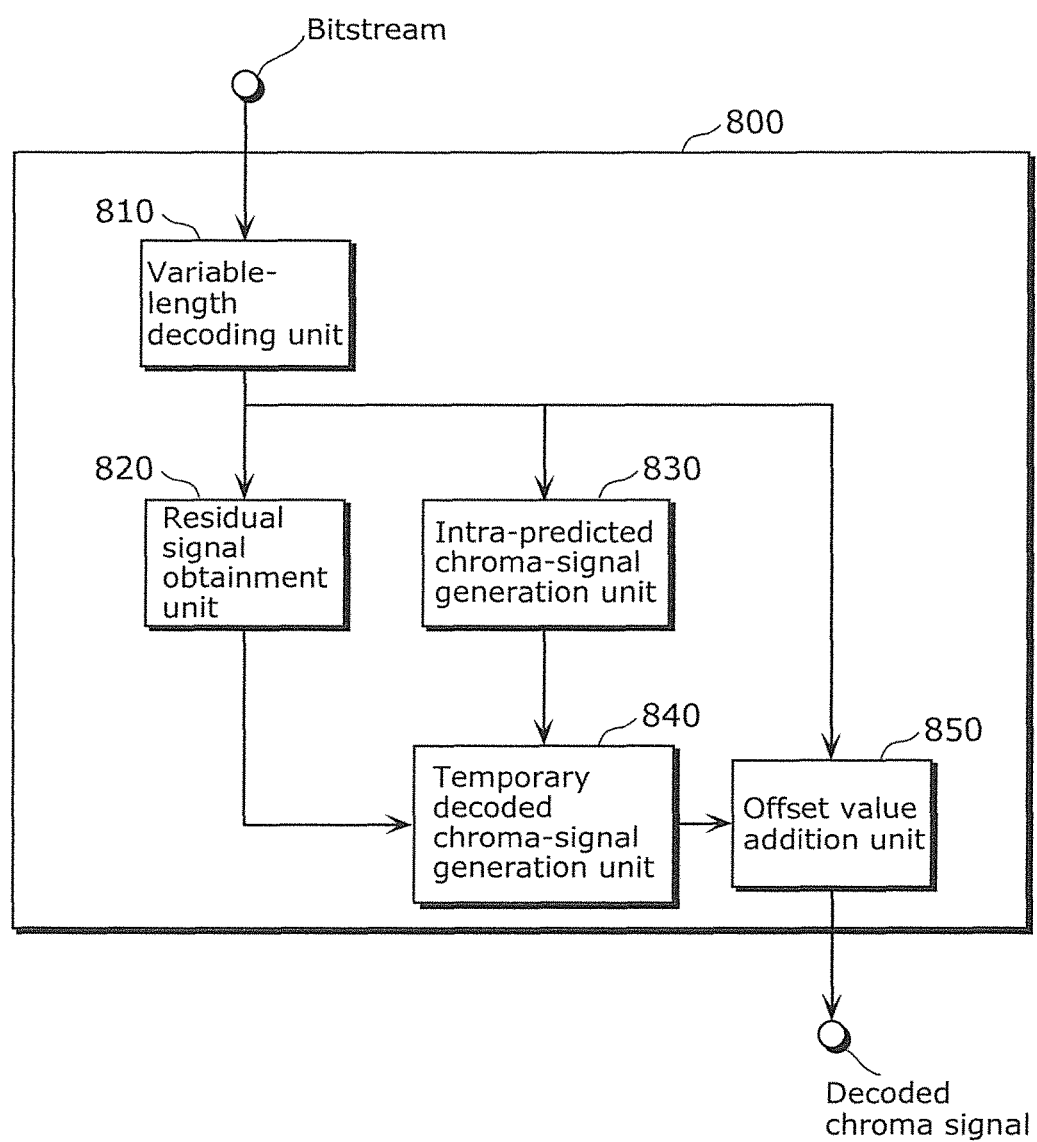
FIG. 15 is a block diagram showing an example of chroma-signal intra prediction in Embodiment 4 according to the present invention.

The following describes a configuration of an image processing apparatus (a chroma-signal intra prediction unit) 800 that executes an intra prediction method in the offset process executed on the chroma signal in Embodiment 4. FIG. 15 is a block diagram showing an example of the configuration of the image processing apparatus 800 in Embodiment 4 according to the present invention. It should be noted that, as described later, the image processing apparatus 800 in Embodiment 4 according to the present invention corresponds to a part of the image decoding apparatus that decodes a coded signal and outputs decoded image data.

As shown in FIG. 15, the image processing apparatus 800 includes a variable-length decoding unit 810, a residual signal obtainment unit 820, an intra-predicted chroma-signal generation unit 830, a temporary decoded chroma-signal generation unit 840, and an offset value addition unit 850.

Figure 16:
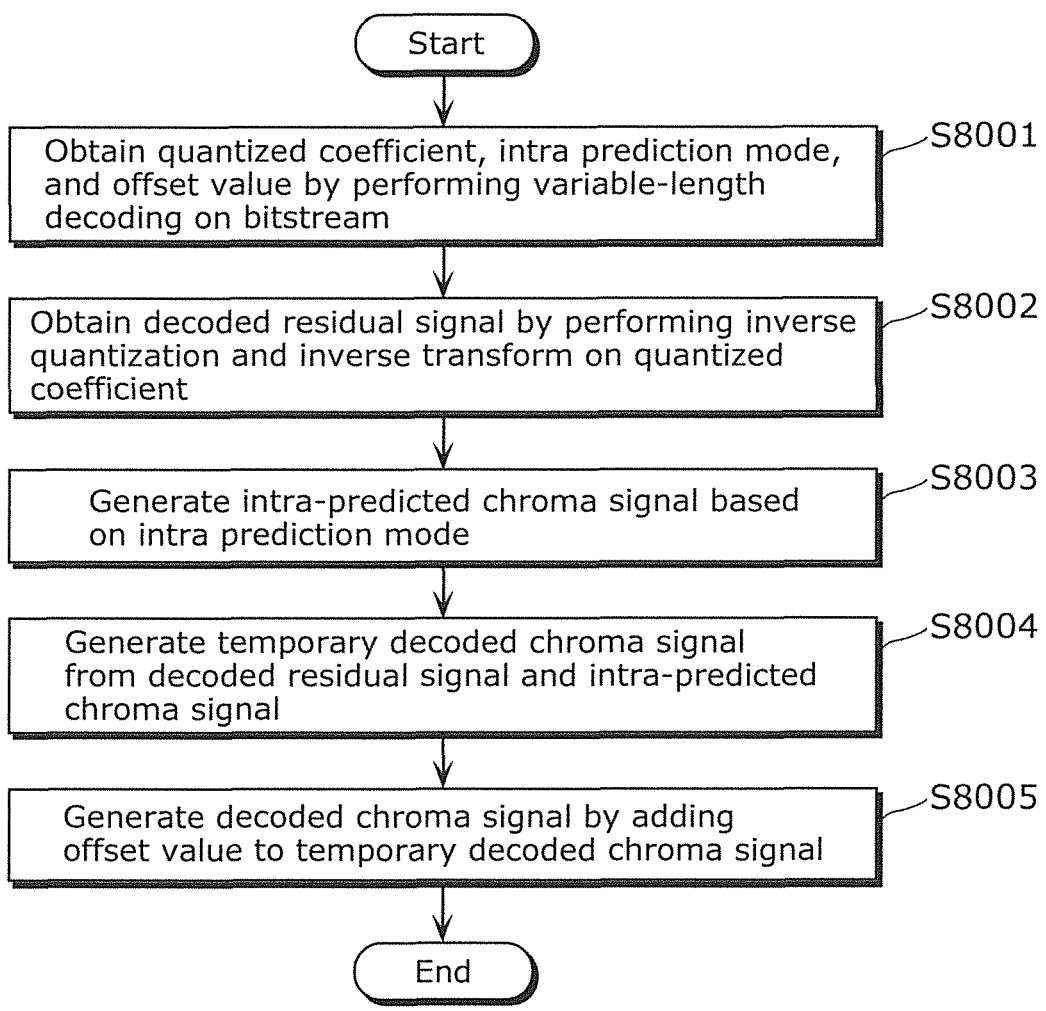
FIG. 16 is a flowchart showing an example of chroma-signal intra prediction in Embodiment 4 according to the present invention.

An operation performed by the image processing apparatus 800 in Embodiment 4 according to the present invention is described in more detail, with reference to FIG. 16. FIG. 16 is a flowchart showing a process performed by the image processing apparatus 800.

Firstly, the variable-length decoding unit 810 obtains quantized coefficients, an intra prediction mode, and an offset value by performing variable-length decoding on the bitstream, and outputs the obtained quantized coefficients, intra prediction mode, and offset value to the residual signal obtainment unit 820 and the offset value addition unit 850 (Step S8001).

Next, the residual signal obtainment unit 820 obtains a decoded residual signal by performing inverse quantization and inverse transform on the quantized coefficients, and outputs the decoded residual signal to the temporary decoded chroma-signal generation unit 840 (Step S8002). The decoded residual signal has been approximated more roughly by the quantization at the time of coding. On account of this, when the decoded chroma signal is generated using this residual signal, an error with respect to the yet-to-be-coded input image is caused.

Next, the intra-predicted chroma-signal generation unit 830 generates an intra-predicted chroma signal based on the intra prediction mode of the chroma signal, and outputs the intra-predicted chroma signal to the temporary decoded chroma-signal generation unit 840 (Step S8003). The intra prediction mode of the chroma signal is indicated as an index number assigned to a generation method of the intra-predicted chroma signal. The intra prediction mode is determined for each block in intra prediction performed at the time of coding. The intra-predicted chroma signal is generated using, as appropriate, a coded luma signal of a neighboring block, a coded chroma signal of a neighboring block, and a coded luma signal of the current block to be processed.

Next, the temporary decoded chroma-signal generation unit 840 generates a temporary decoded chroma signal from the decoded residual signal and the intra-predicted chroma signal (Step S8004). The temporary decoded chroma signal is calculated by adding the decoded residual signal to the intra-predicted chroma signal.

Next, the offset value addition unit 850 generates a decoded chroma signal by adding the offset value to the temporary decoded chroma signal (Step S8006). Note that the offset value is calculated when intra prediction is made at the time of coding. The decoded chroma signal generated by the offset value addition unit 850 is stored into a memory, which is not illustrated, to be used in a later intra prediction process for example.

With this, an error between the yet-to-be-coded input chroma signal and the decoded chroma signal can be reduced. Moreover, color distortion of the decoded chroma signal can be suppressed.

It should be noted that the aforementioned offset process may also be performed on the luma signal in the same way. As a result, a coded image signal closer in luma to the input signal can be obtained as well.

FIG. 21 is a diagram showing an example where Embodiment 4 according to the present invention is shown as a syntax based on the HEVC standard (see Non Patent Literature 3). When an image signal in the YUV format is coded, offset values of U and V components are decoded for each unit of prediction after the intra prediction mode of the chroma signal is decoded.

Embodiment 5

An image decoding method in Embodiment 5 further executes the following process. More specifically, in the performing of variable-length decoding, first flag information indicating whether or not the offset process is required is further obtained. In the executing of the offset process, the offset process is executed when the first flag information indicates that the offset process is required.

Next, an operation performed by an image processing apparatus (a chroma-signal intra prediction unit) 900 in Embodiment 5 according to the present invention is described.

Figure 17:
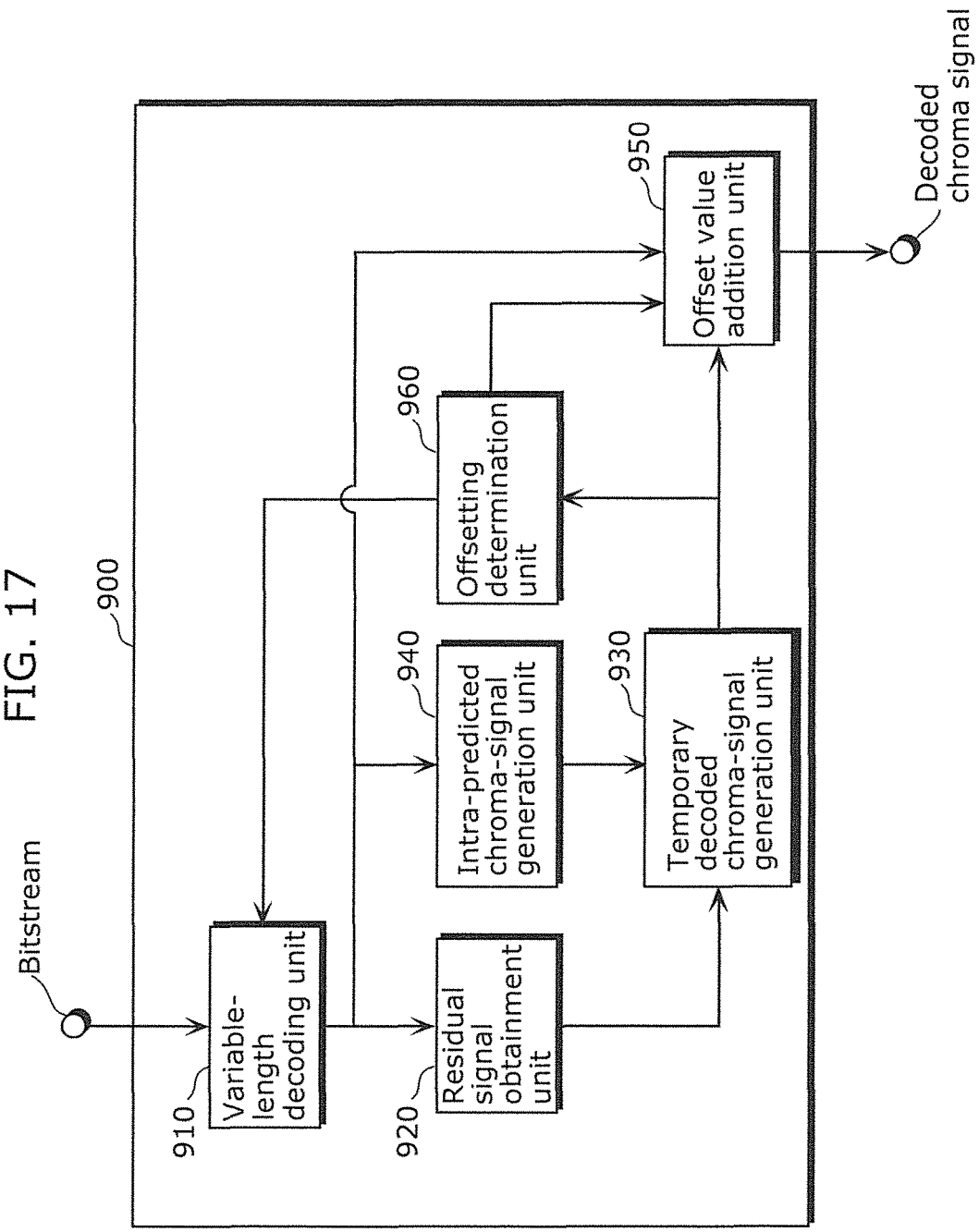
FIG. 17 is a block diagram showing an example of chroma-signal intra prediction in Embodiment 5 according to the present invention.

FIG. 17 is a block diagram showing a configuration of the image processing apparatus 900 in Embodiment 5.

As shown in FIG. 17, the image processing apparatus 900 includes a variable-length decoding unit 910, a residual signal obtainment unit 920, a temporary decoded chroma-signal generation unit 930, an intra-predicted chroma-signal generation unit 940, an offset value addition unit 950, and an offsetting determination unit 960. More specifically, as compared with the image processing apparatus 800 shown in FIG. 15, the image processing apparatus 900 shown in FIG.

17 additionally includes the offsetting determination unit 960. The other components of the image processing unit 900 are identical to the corresponding components of the image processing apparatus 800 and, therefore, detailed explanations of these components are not repeated here.

The descriptions of the components that are included in the image processing apparatus 900 and identical to the corresponding components included in the image processing apparatus 800 in Embodiment 4 are omitted. Thus, the offsetting determination unit 970 that is a difference between the image processing apparatus 900 and the image processing apparatus 800 is described. To be more specific, in Embodiment 5, whether or not the offset process is required is determined and the offset process is executed only on the block where the offset process is required.

Figure 18:
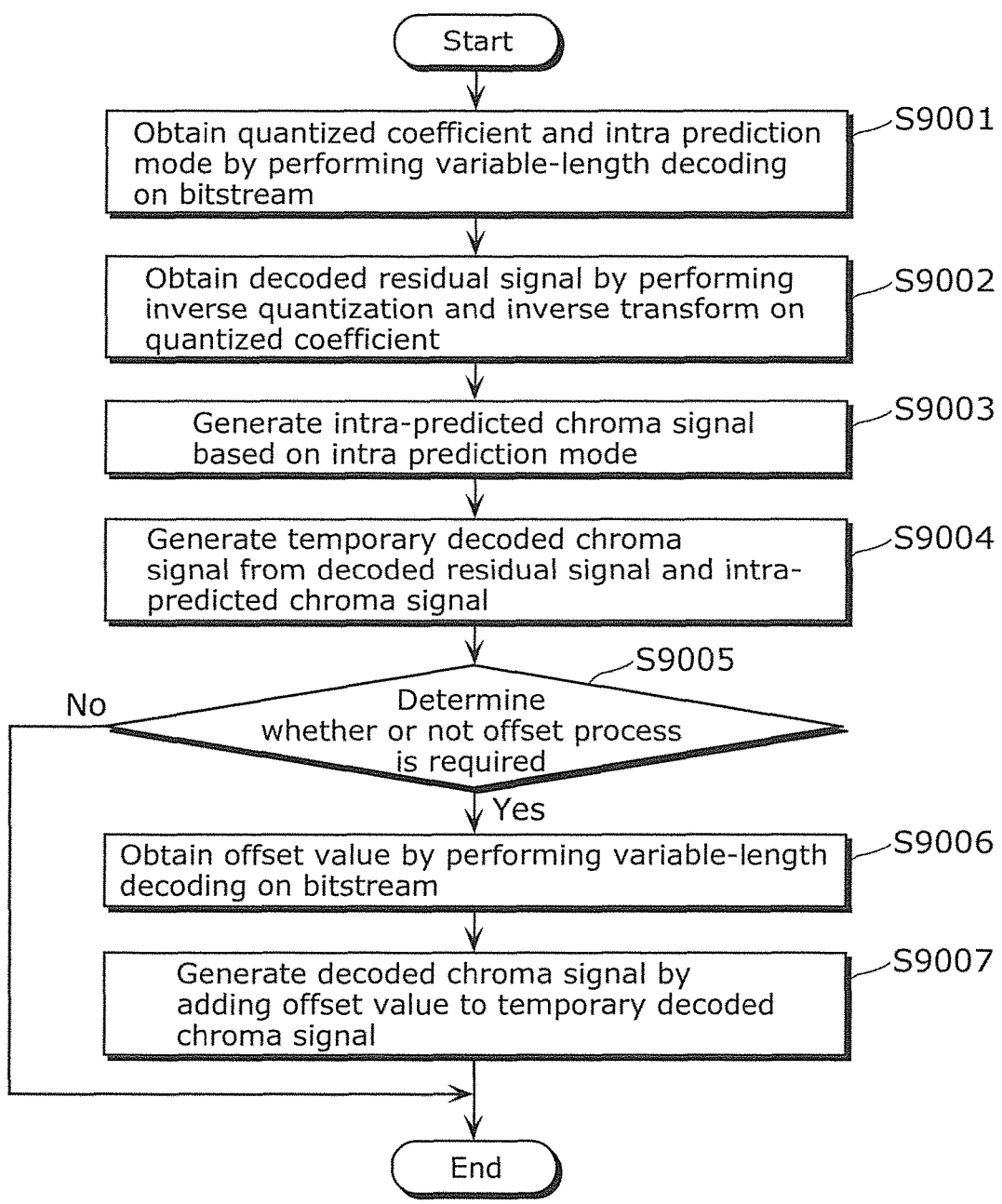
FIG. 18 is a flowchart showing an example of chroma-signal intra prediction in Embodiment 5 according to the present invention.

Next, chroma-signal intra prediction performed by the image processing apparatus 900 is described. FIG. 18 is a flowchart showing chroma-signal intra prediction according to the image coding method in Embodiment 5. Detailed explanations on processes shown in FIG. 18 that are identical to the corresponding processes explained in Embodiment 4 with reference to FIG. 16 are not repeated here. Thus, Steps S9005 to S9007 in FIG. 18 are mainly described.

In Step S9005, the offsetting determination unit 960 determines, using the decoded luma signal and the temporary decoded chroma signal of the current block, whether or not the offset process is required. This determination is made according to, for example, the same method as used in Embodiment 2. Color distortion caused to the decoded chroma signal by an error between the yet-to-be-coded input chroma signal and the decoded chroma signal depends on the values of the chroma signal and the luma signal. More specifically, even with the same error value, the color distortion appears differently in the subjective image quality according to the values of the chroma signal and luma signal. On account of this, the offsetting determination unit 960 determines that the offset process is required when the temporary decoded signal exists in a range (may also be referred to as "the range A" hereafter) where color distortion in the subjective image quality is apparent in the chroma space and the luma space.

A data structure of the range A may be expressed based on the maximum value and the minimum value for each component of YUV and RGB, or based on a color map having three axes corresponding to YUV or RGB. Moreover, the input signal used for the determination may be, for example, average values of the input chroma signal and the input luma signal in the current block, DC components obtained by frequency transforms performed on the input chroma signal and the input luma signal, or median values of the input chroma signal and the input luma signal.

Then, when it is determined in Step S9005 that the offset process is required, Steps S9006 to S9007 are performed. In Step S9006, the variable-length decoding unit 910 obtains the offset value by performing variable-length decoding on the bitstream, and outputs the obtained offset value to the offset value addition unit 950.

Next, in Step S9007, the offset value addition unit 950 generates a decoded chroma signal by adding the offset value to the temporary decoded chroma signal. The decoded chroma signal generated by the offset value addition unit 950 is stored into a memory, which is not illustrated in the diagram, to be used for a later intra prediction process, for example.

On the other hand, when it is determined in Step S9005 that the offset process is not required, the offset process is not performed. Thus, the temporary decoded chroma signal is used as the decoded chroma signal without change.

With this, color distortion of the coded chroma signal can be suppressed while the number of bits of the bitstream is suppressed.

It should be noted that the aforementioned offset process may also be performed on the luma signal in the same way. As a result, a coded image signal closer in luma to the input signal can be obtained as well.

A method of determining whether or not the offset process is required is not limited to the aforementioned method. For example, the offsetting determination unit 960 obtains, from the bitstream, first flag information indicating whether or not the offset process is required. Then, whether or not the offset process is required may be determined according to the value set in the obtained first flag information.

Embodiment 6

An image decoding method in Embodiment 6 further performs the following process. To be more specific, in the obtaining of quantized coefficients and first flag information, second flag information is further obtained, the second flag information indicating whether the offset value for a previously-decoded block adjacent to the decoded block or the offset value newly calculated for the temporary decoded block is used in the offset process to be executed on the temporary decoded block (i.e., the second flag information indicating whether or not the offset value needs to be updated). In the generating of the decoded block, the offset process is executed on the temporary decoded block using the offset value indicated by the second flag information.

Next, an operation performed by an image processing apparatus (a chroma-signal intra prediction unit) 1000 in Embodiment 6 according to the present invention is described.

Figure 19:
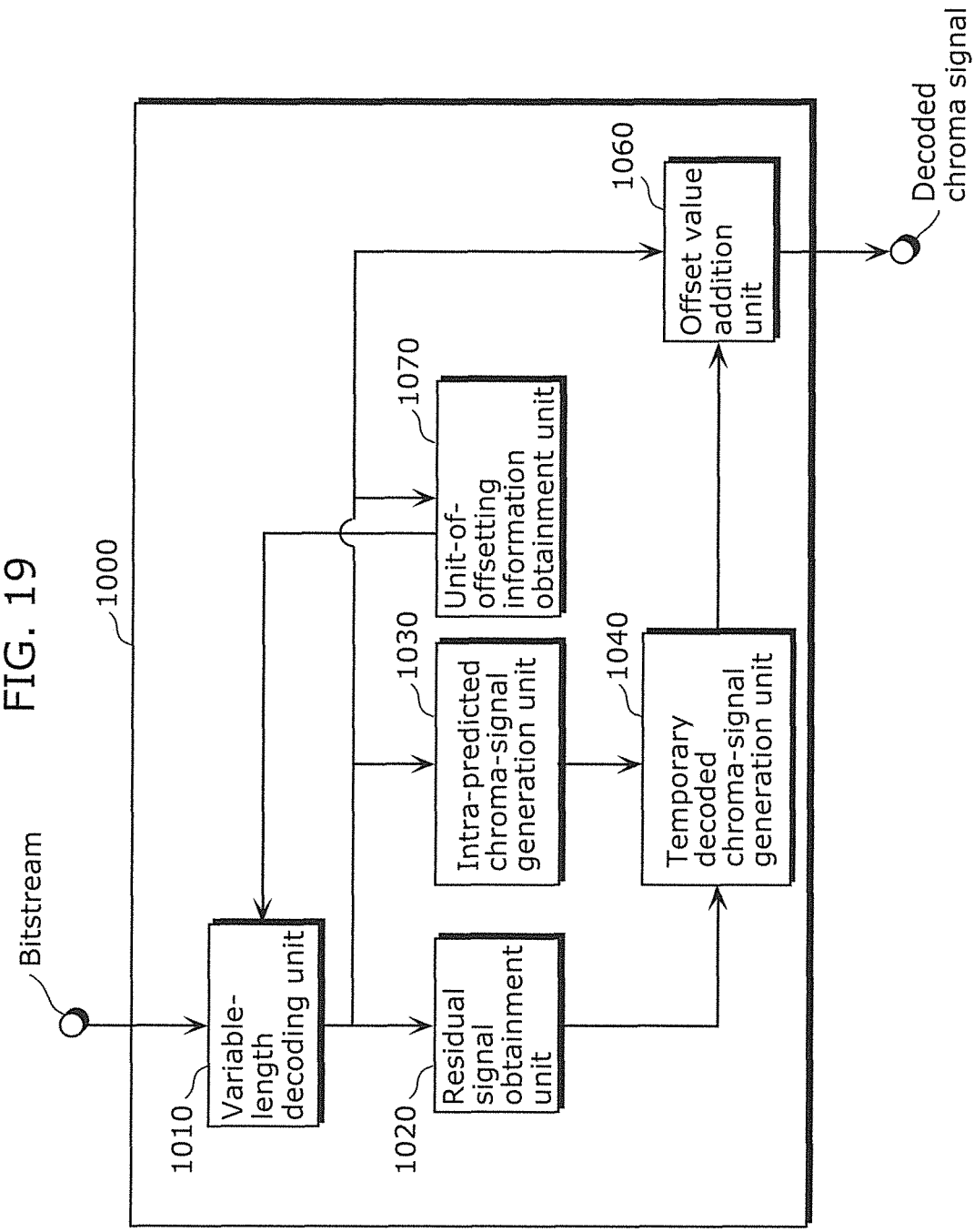
FIG. 19 is a block diagram showing an example of chroma-signal intra prediction in Embodiment 6 according to the present invention.

FIG. 19 is a block diagram showing a configuration of the image processing apparatus 1000 in Embodiment 6.

As shown in FIG. 19, the image processing apparatus 1000 includes a variable-length decoding unit 1010, a residual signal obtainment unit 1020, an intra-predicted chroma-signal generation unit 1030, a temporary decoded chroma-signal generation unit 1040, an offset value addition unit 1060, and a unit-of-offsetting information obtainment unit 1070. More specifically, as compared with the image processing apparatus 800 shown in FIG. 15, the image processing apparatus 1000 additionally includes the unit-of-offsetting information obtainment unit 1070. The other components of the image processing unit 1000 are identical to the corresponding components of the image processing apparatus 800 and, therefore, detailed explanations of these components are not repeated here.

The descriptions of the components that are included in the image processing apparatus 1000 and identical to the corresponding components included in the image processing apparatus 800 in Embodiment 4 are omitted. Thus, the unit-of-offsetting information obtainment unit 1070 that is a difference between the image processing apparatus 1000 and the image processing apparatus 800 is described. The image processing apparatus 1000 in Embodiment 6 allows the offset process to be performed on a plurality of neighboring blocks using the same offset value.

Figure 20:
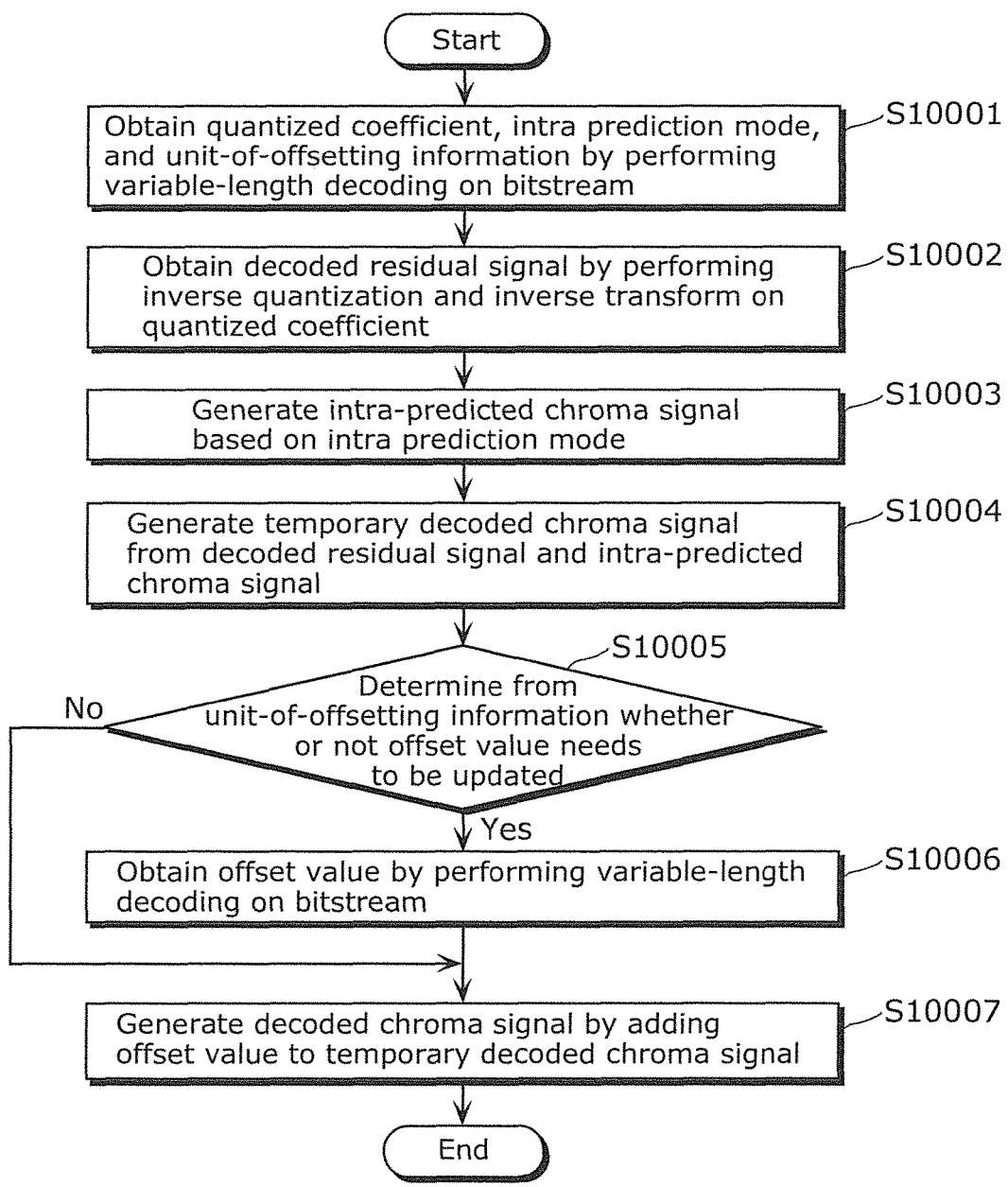
FIG. 20 is a flowchart showing an example of chroma-signal intra prediction in Embodiment 6 according to the present invention.

Next, chroma-signal intra prediction performed by the image processing apparatus 1000 is described. FIG. 20 is a flowchart showing chroma-signal intra prediction according to the image decoding method in Embodiment 6. Detailed explanations on processes that are identical to the corresponding processes explained in Embodiment 4 with reference to FIG. 16 are not repeated here. Thus, Step S10001 and Steps S10005 to S10007 in FIG. 20 are mainly described.

In Step S10001, the variable-length decoding unit 1010 obtains quantized coefficients, an intra prediction mode, and unit-of-offsetting information by performing variable-length decoding on the bitstream, and outputs the obtained quantized coefficients, intra prediction mode, and unit-of-offsetting information to the residual signal obtainment unit 1020, the intra-predicted chroma-signal generation unit 1030, the unit-of-offsetting information obtainment unit 1070, and the offset value addition unit 1060. The unit-of-offsetting information refers to information about whether, in an area A including a plurality of blocks, the same offset value is used for all the blocks or a different offset value is used for each of the blocks.

Next, in Step S10005, the unit-of-offsetting information obtainment unit 1070 verifies, from the unit-of-offsetting information, whether or not the offset value needs to be updated and outputs the result to the variable-length decoding unit 1010. When the same offset value is used for all the blocks of the area A, the offset value is updated only when the offset process is completed for all the blocks of the area A. On the other hand, when a different offset value is used for each of the blocks of the area A, the offset value is updated for each of the blocks.

When the offset value needs to be updated, the variable-length decoding unit 1010 obtains the offset value by performing variable-length decoding on the bitstream and outputs the obtained offset value to the offset value addition unit 1060 in Step S10006. Here, the offset value is calculated when intra prediction is made at the time of coding.

Next, in Step S10007, the offset value addition unit 1060 generates a decoded chroma signal by adding the offset value to the temporary decoded chroma signal.

As a result, the offset values of an area larger than a block can be coded by one operation. This can suppress an increase in the number of bits of the coded signal and also suppress color distortion of the decoded chroma signal.

It should be noted that the aforementioned offset process may also be performed on the luma signal in the same way. As a result, a coded image signal closer in luma to the input signal can be obtained as well.

FIG. 22 is a diagram showing an example where Embodiment 6 according to the present invention is shown as a syntax based on the HEVC standard (see Non Patent Literature 3). When an image signal in the YUV format is coded, offset values of U and V components are decoded for each coding tree (a group of units of coding) in the case of an I-slice, after the intra prediction mode of the chroma signal is decoded.

Embodiment 7

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 23:
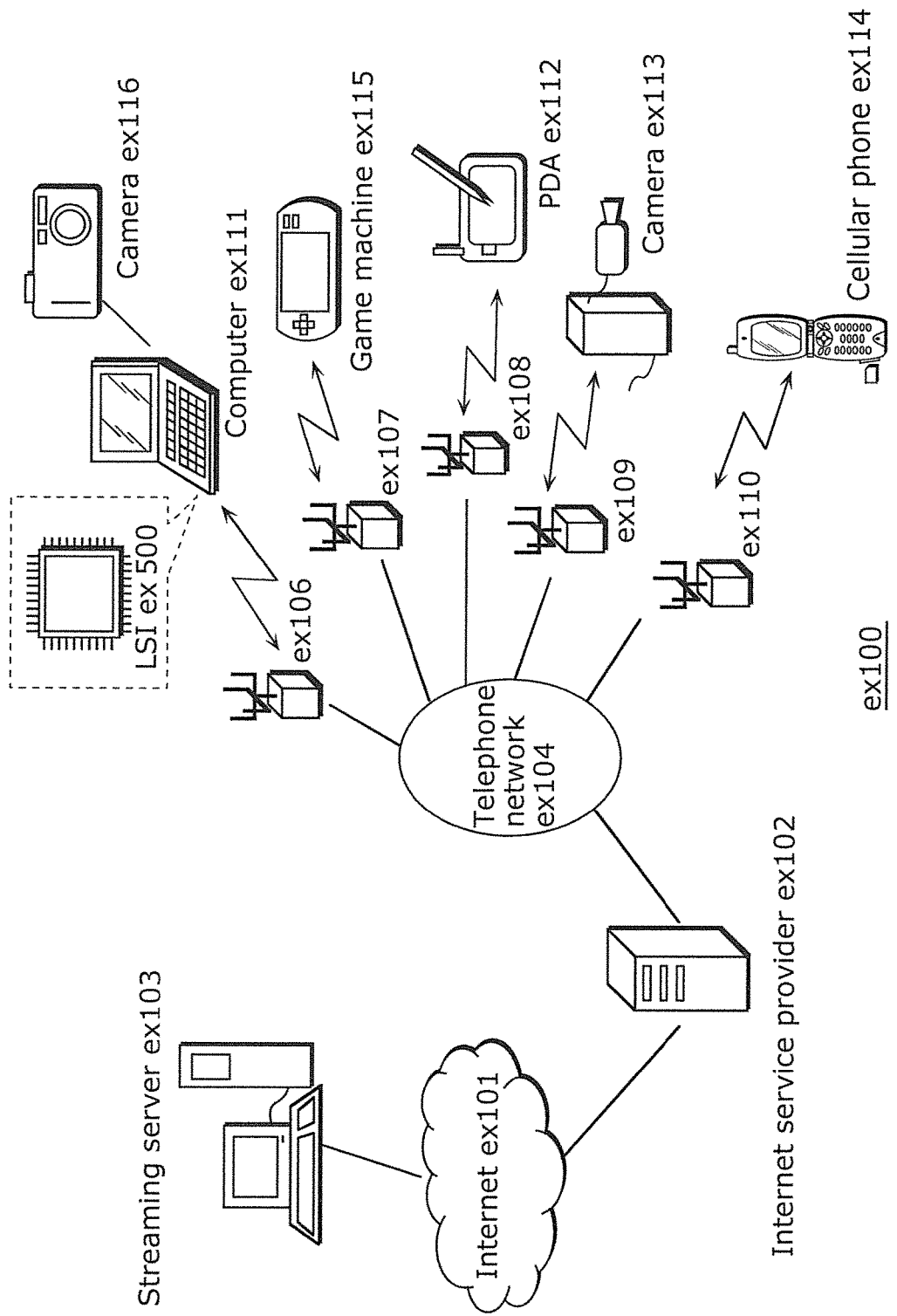
FIG. 23 shows an overall configuration of a content providing system for implementing content distribution services.

FIG. 23 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 23, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 24:
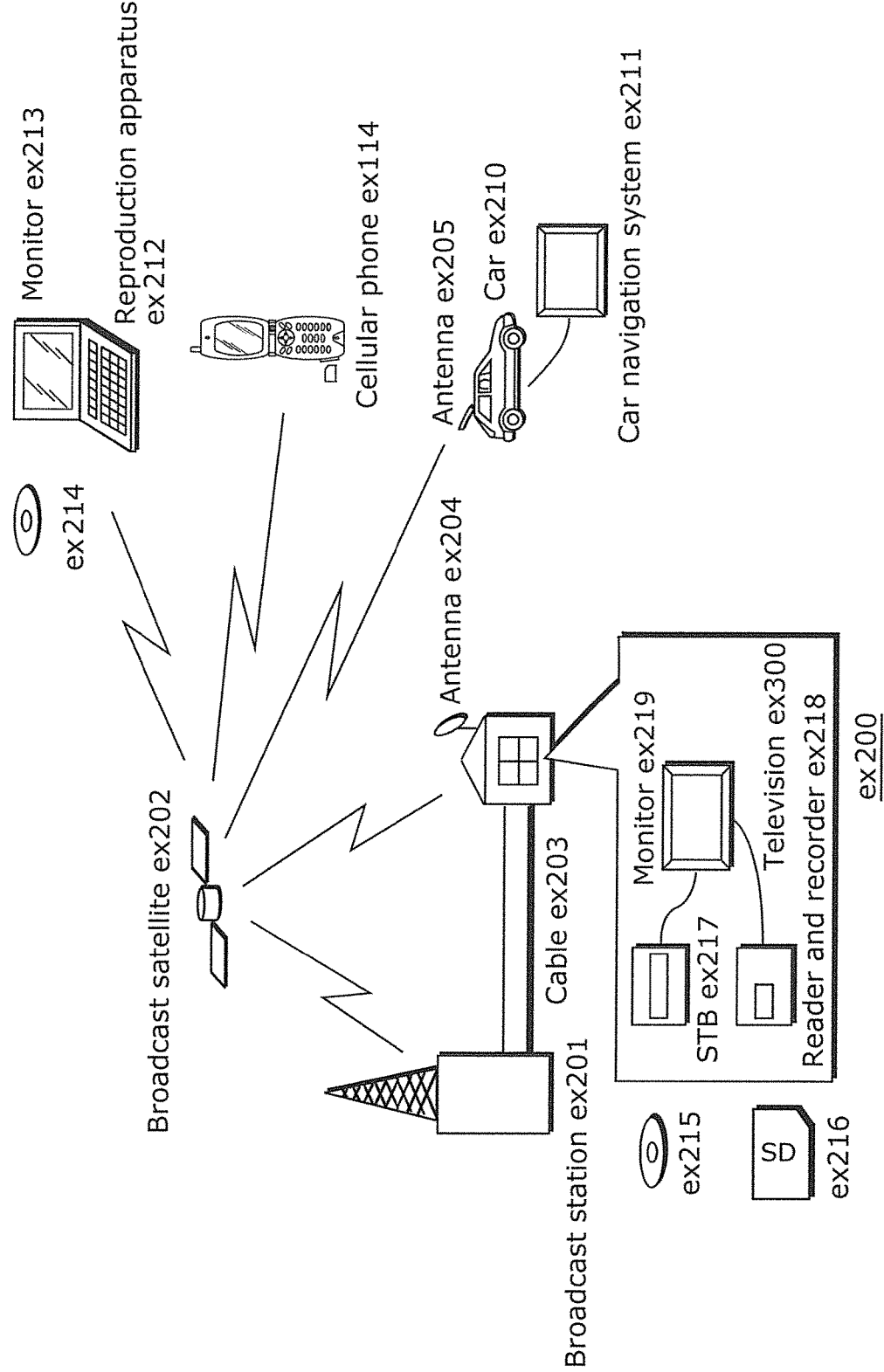
FIG. 24 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 24. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 25:
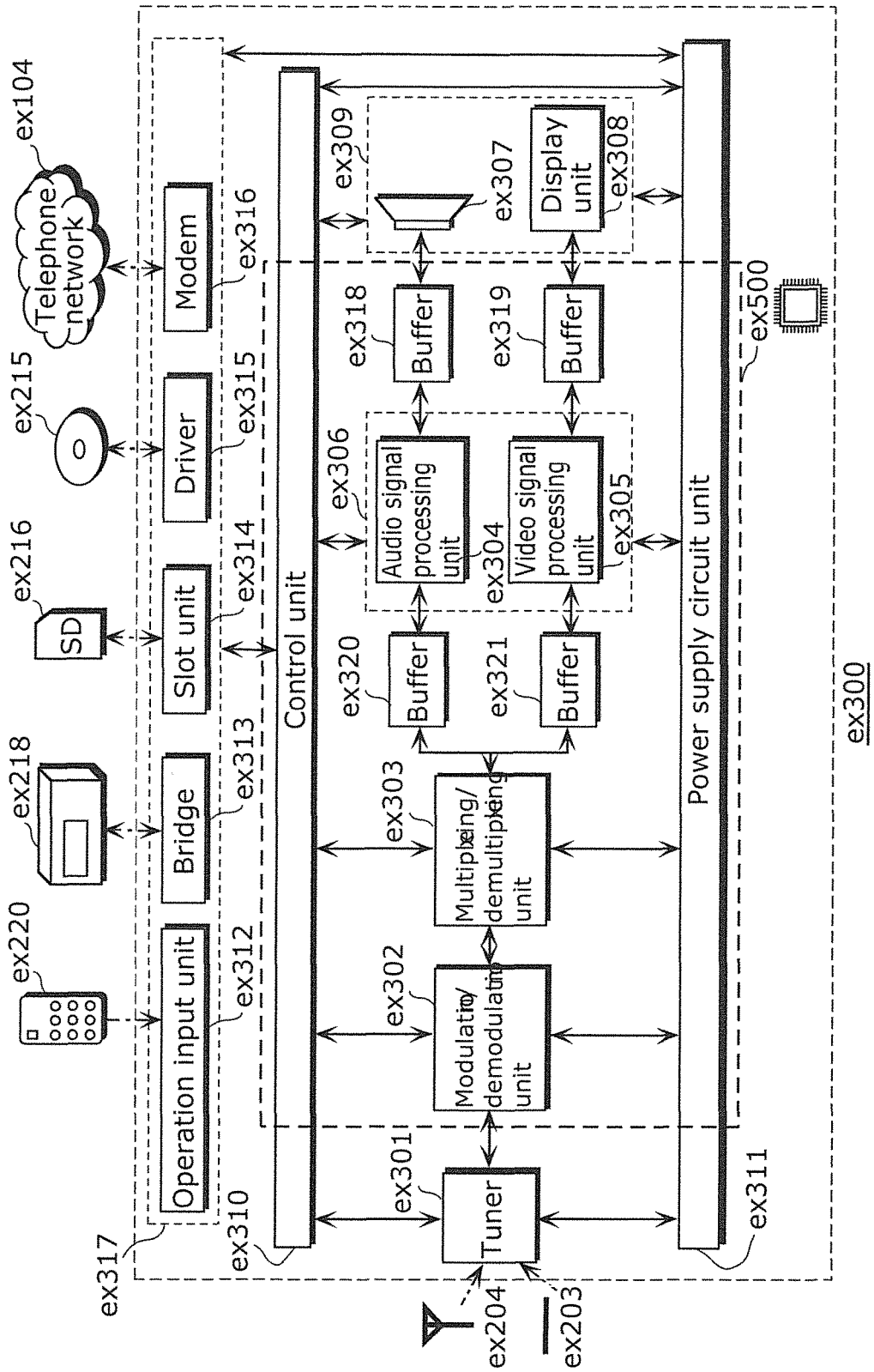
FIG. 25 shows a block diagram illustrating an example of a configuration of a television.

FIG. 25 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 26:
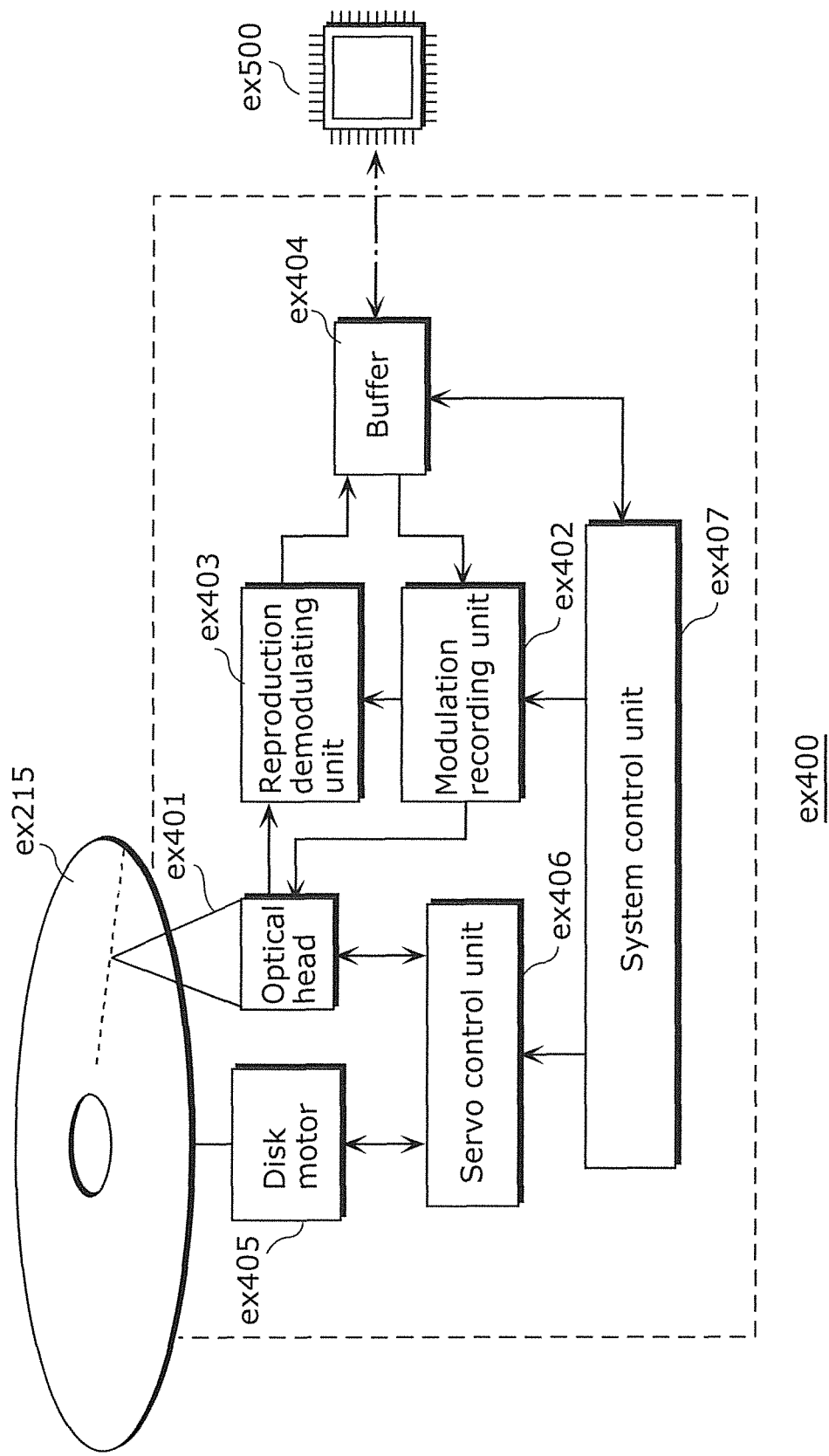
FIG. 26 shows a block diagram illustrating an example of a configuration of an information reproducing/recording unit that reads and writes information from and on a recording medium that is an optical disk.

As an example, FIG. 26 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 27:
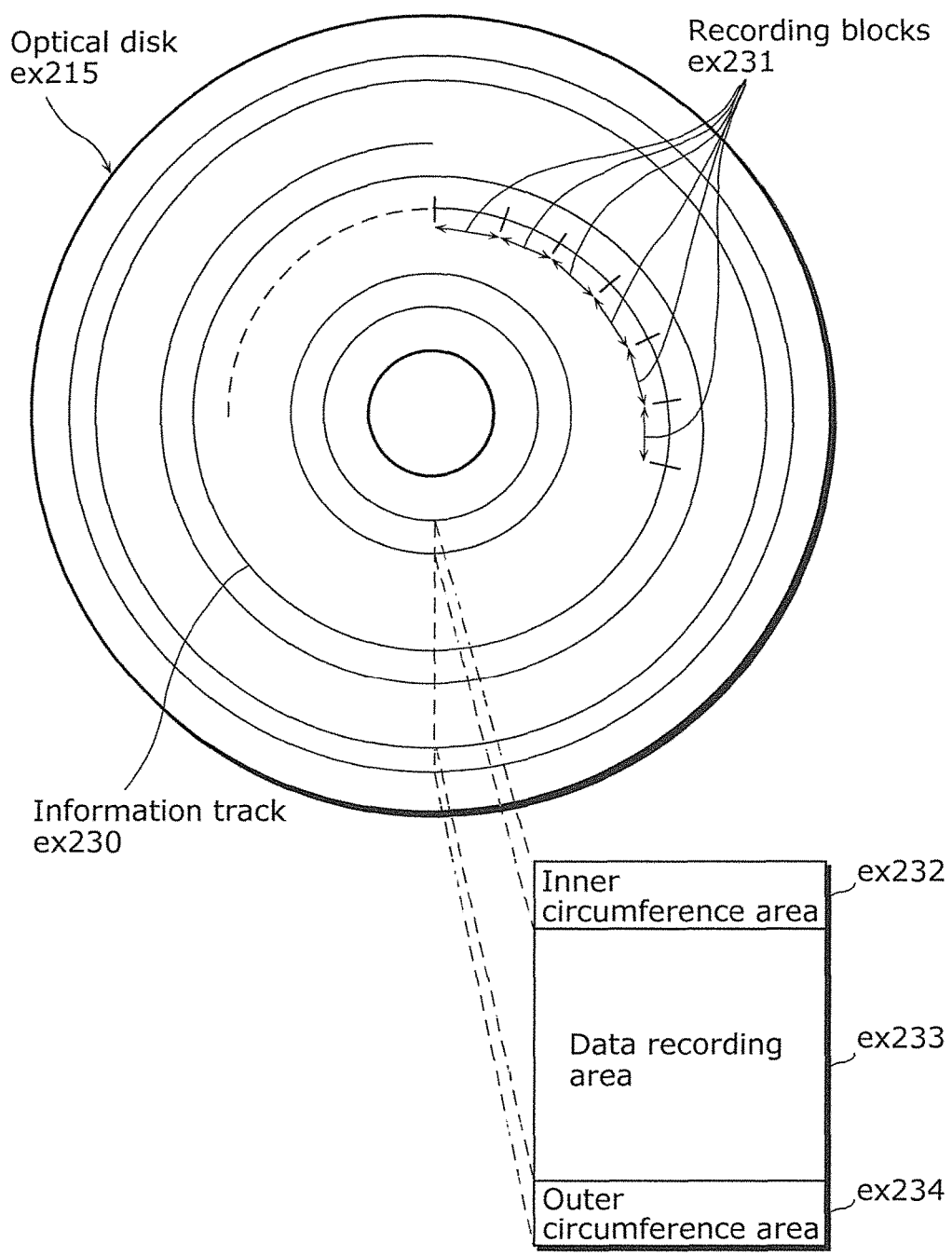
FIG. 27 shows an example of a configuration of a recording medium that is an optical disk.

FIG. 27 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 25. The same will be true for the configuration of the computer ex111, the cellular phone ex114, and others.

Figure 28A:
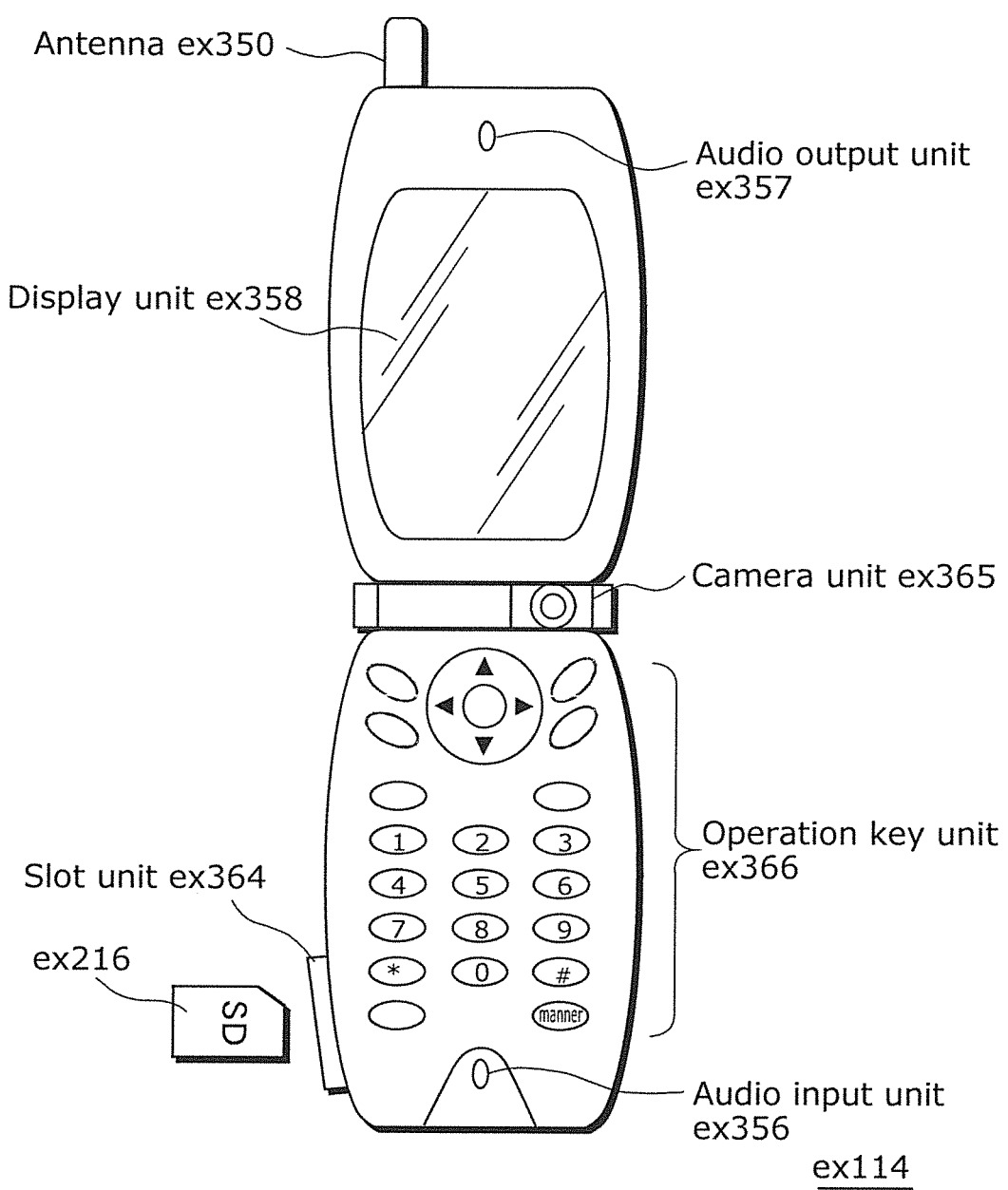
FIG. 28A shows an example of a cellular phone.

FIG. 28A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 28B:
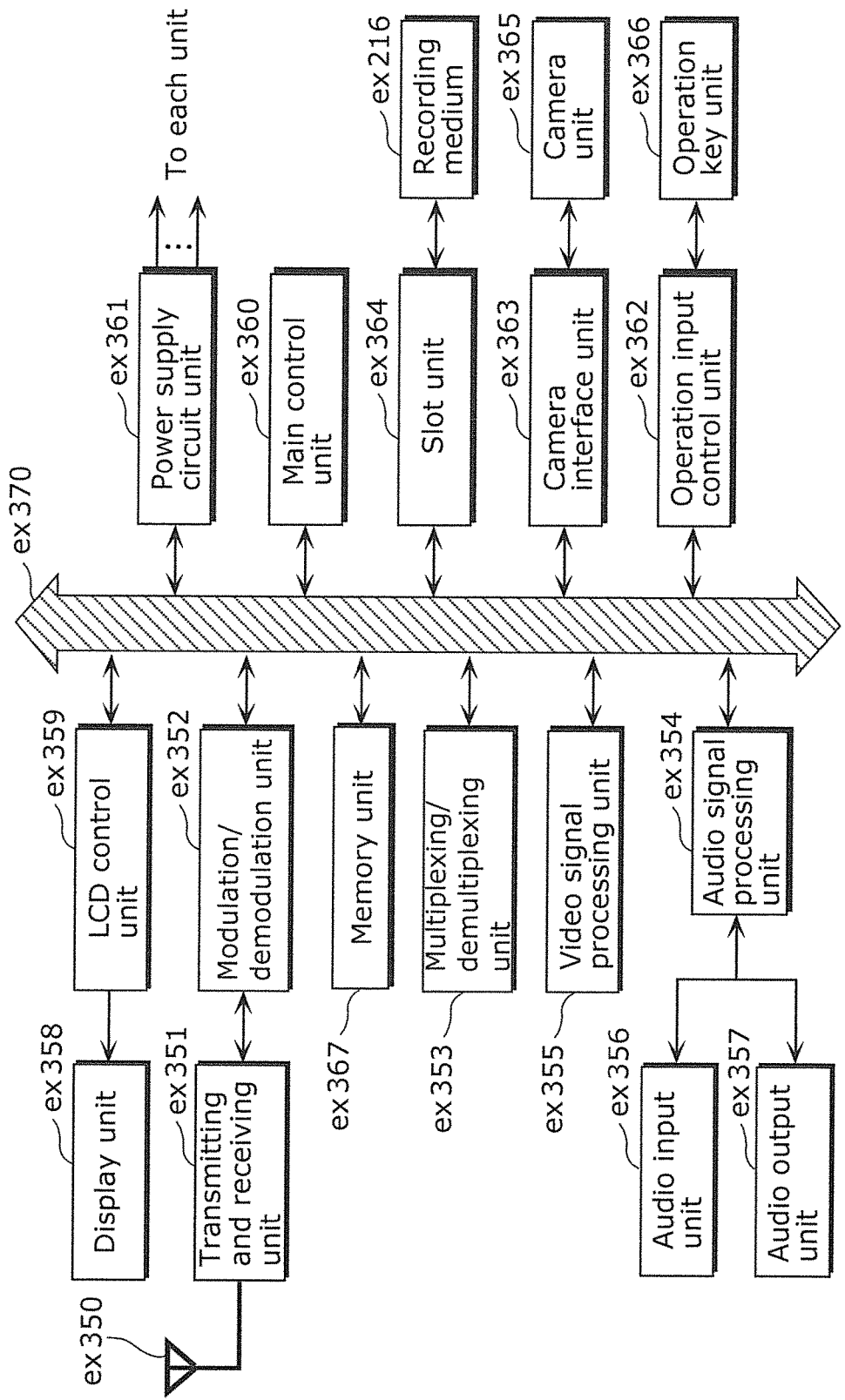
FIG. 28B is a block diagram showing an example of a configuration of a cellular phone.

Next, an example of a configuration of the cellular phone ex114 will be described with reference to FIG. 28B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 8

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 29 illustrates a structure of the multiplexed data. As illustrated in FIG. 29, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 30:
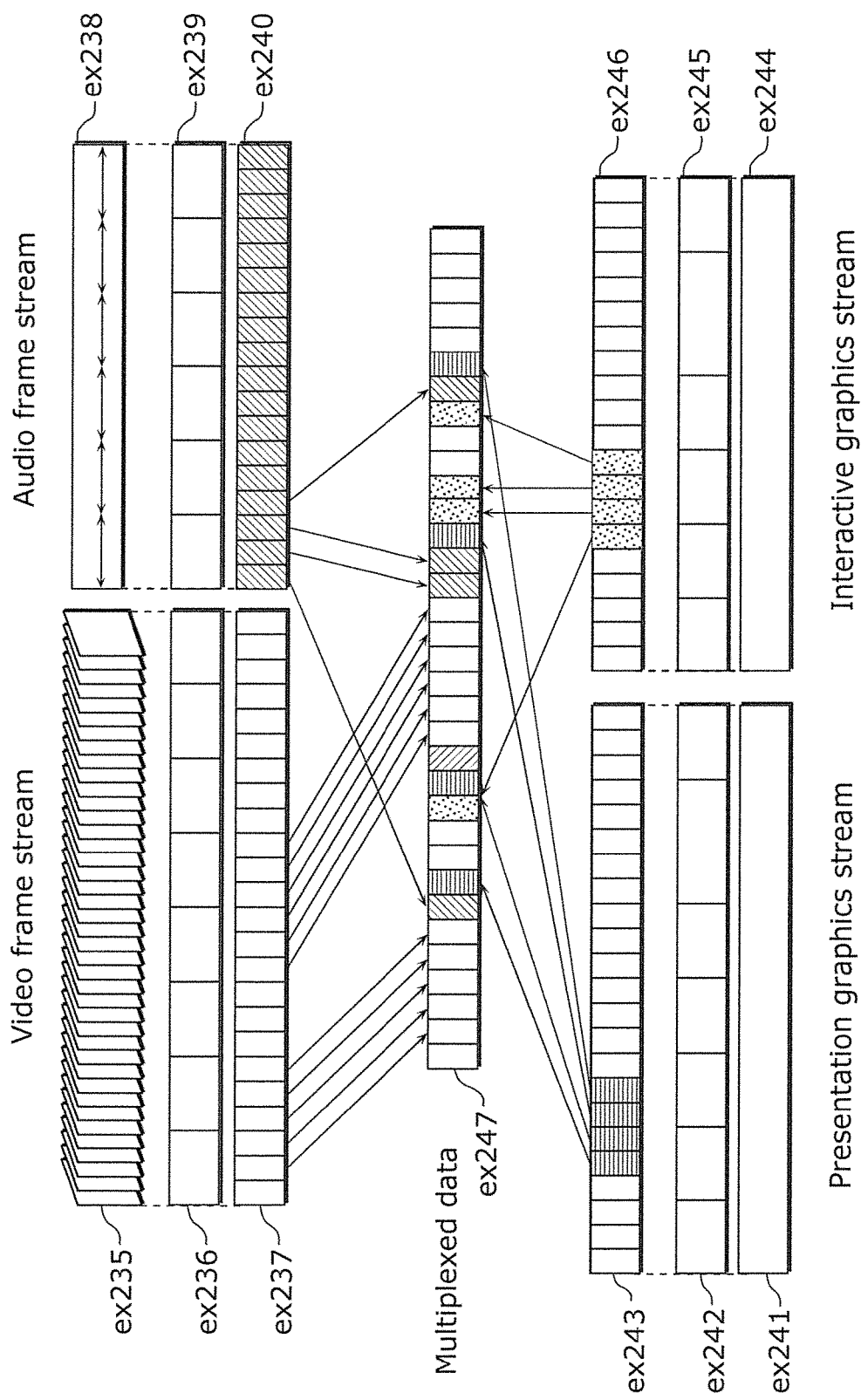
FIG. 30 schematically shows how each stream is multiplexed in multiplexed data.

FIG. 30 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 31:
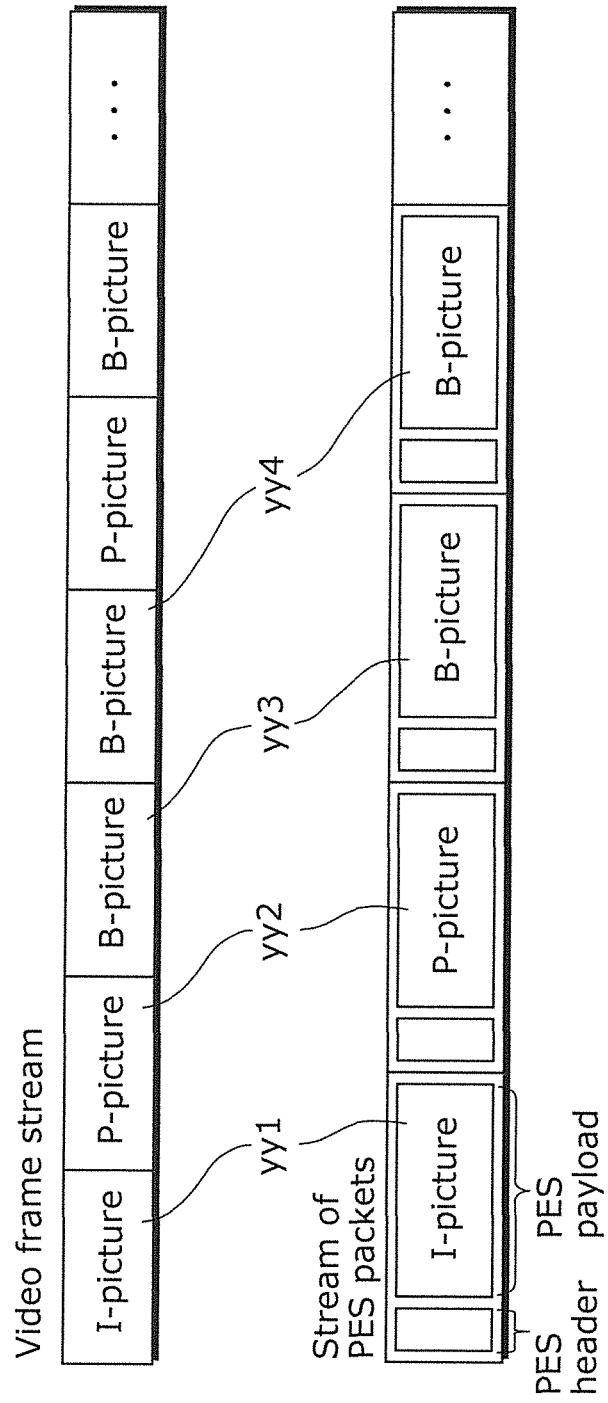
FIG. 31 shows how a video stream is stored in a stream of PES packets in more detail.

FIG. 31 illustrates how a video stream is stored in a stream of PES packets in more detail. The first bar in FIG. 31 shows a video frame stream in a video stream. The second bar shows the stream of PES packets. As indicated by arrows denoted as yy1, yy2, yy3, and yy4 in FIG. 31, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 32 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 32. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 33:
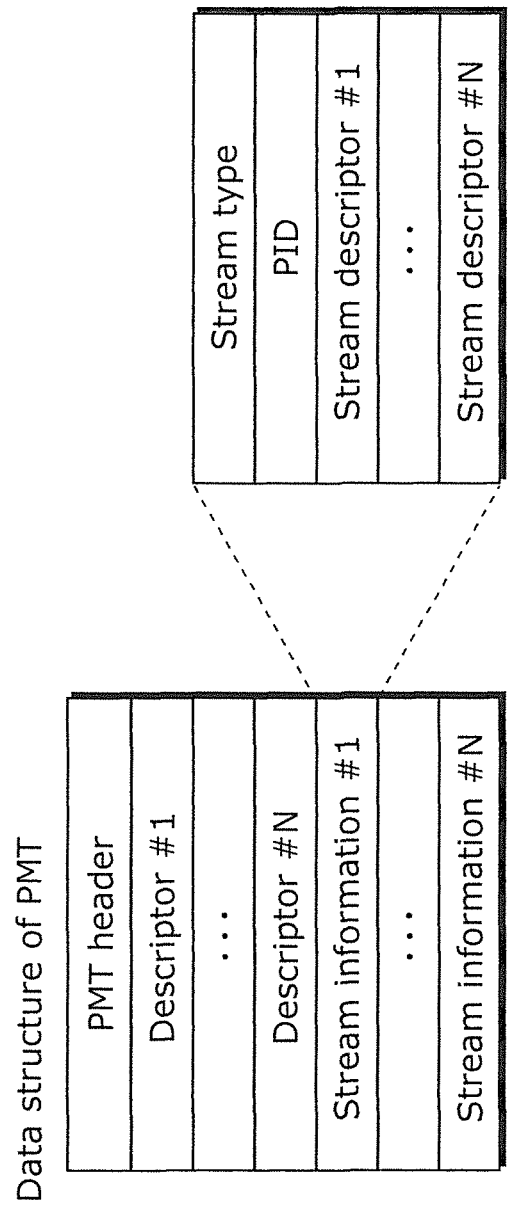
FIG. 33 shows a data structure of a PMT.

FIG. 33 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 34:
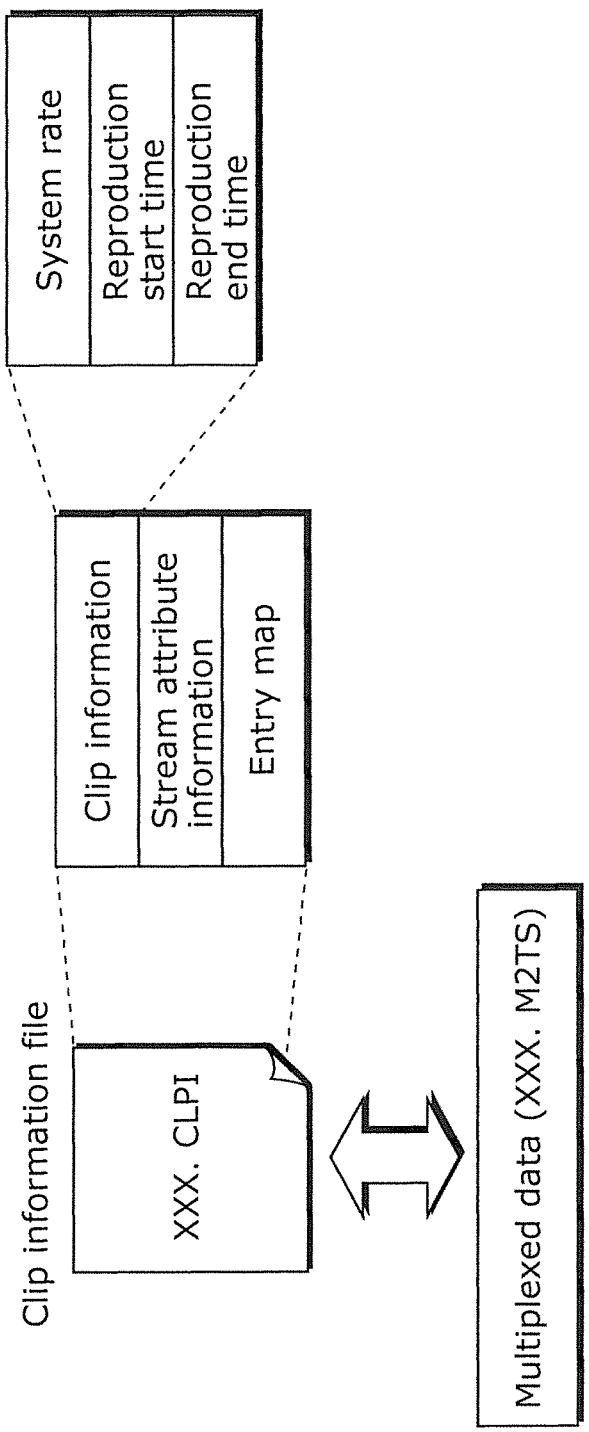
FIG. 34 shows an internal structure of multiplexed data information.

Each of the multiplexed data information files is management information of the multiplexed data as shown in FIG. 34. The multiplexed data information files are in one to one correspondence with the multiplexed data, and each of the files includes multiplexed data information, stream attribute information, and an entry map.

As illustrated in FIG. 34, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 35:
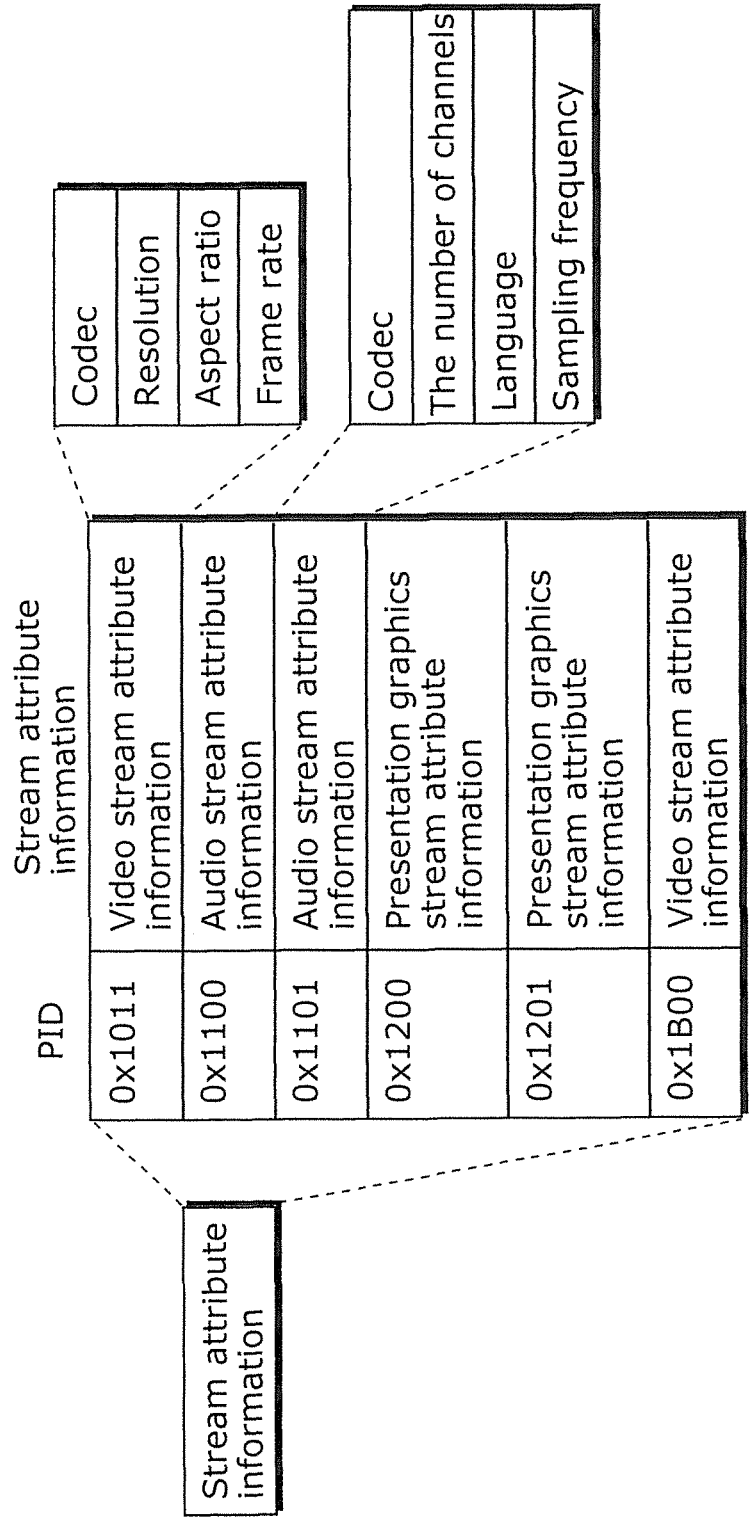
FIG. 35 shows an internal structure of stream attribute information.

As shown in FIG. 35, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 36:
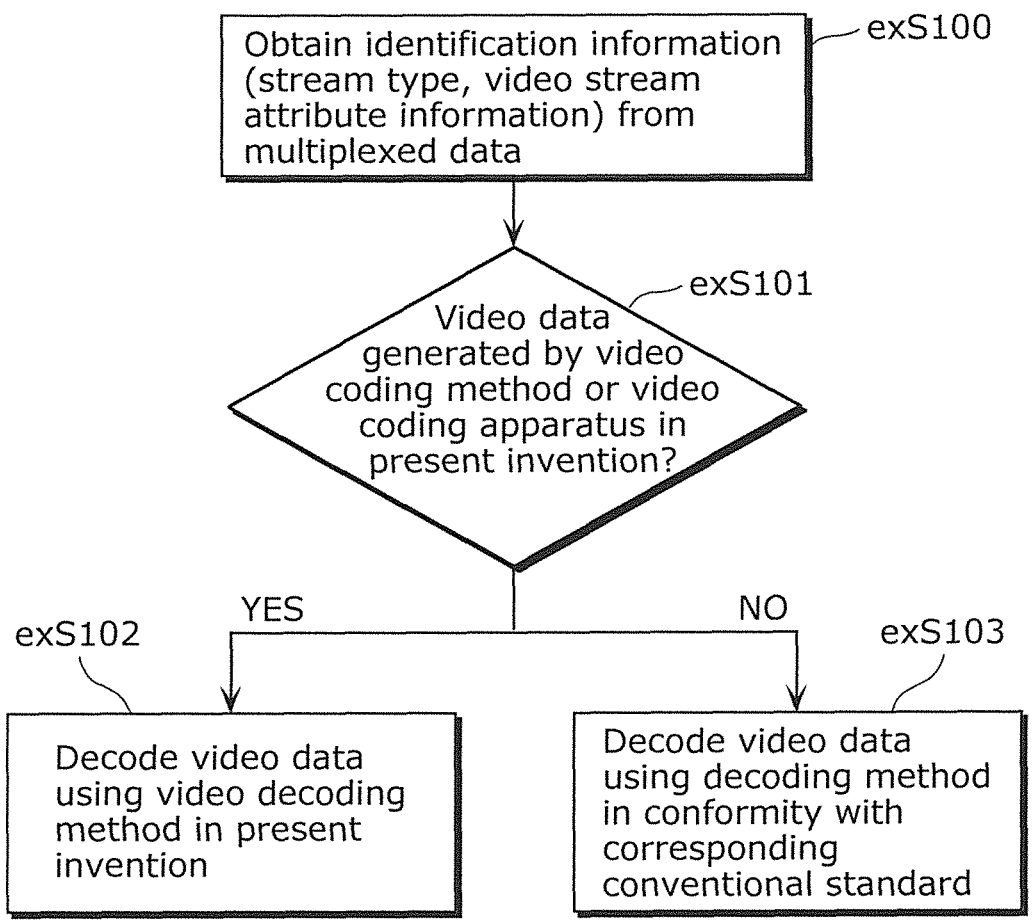
FIG. 36 shows steps for identifying video data.

Furthermore, FIG. 36 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 9

Figure 37:
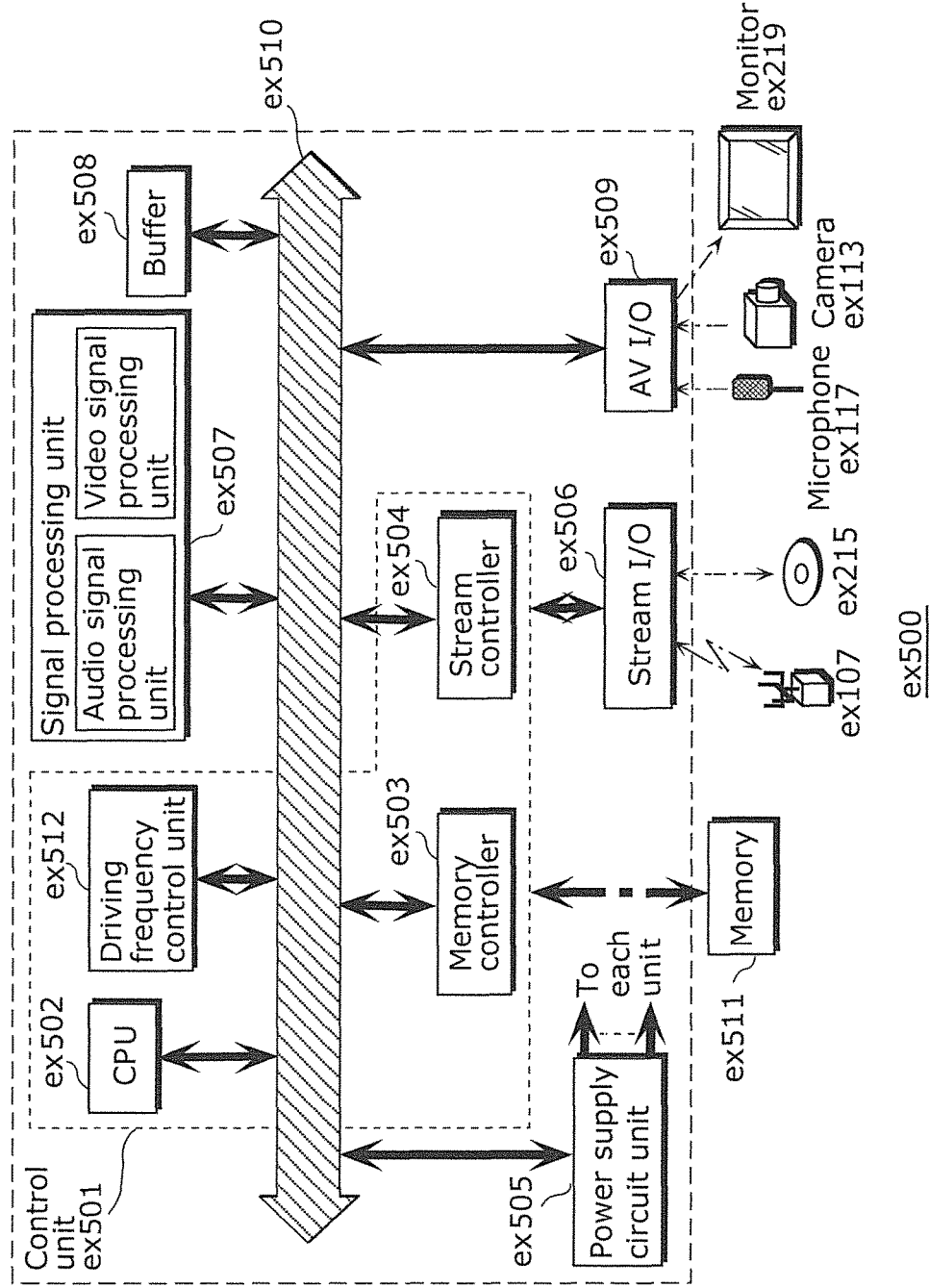
FIG. 37 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 37 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 10

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 38:
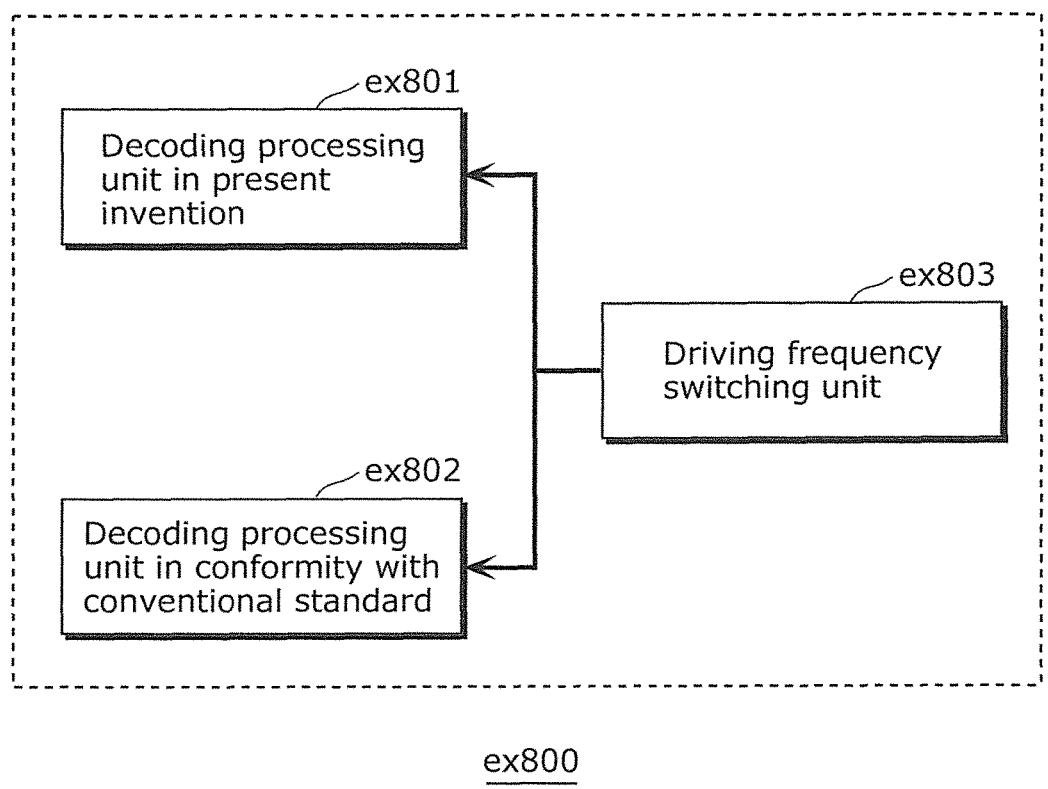
FIG. 38 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 38 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 37. Here, each of the decoding processing unit ex801 that executes the moving picture decoding method described in each of embodiments and the decoding processing unit ex802 that conforms to the conventional standard corresponds to the signal processing unit ex507 in FIG. 37. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 8 is probably used for identifying the video data. The identification information is not limited to the one described in Embodiment 8 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 40. The driving frequency can be selected by storing the look-up table in the buffer ex508 and in an internal memory of an LSI, and with reference to the look-up table by the CPU ex502.

Figure 39:
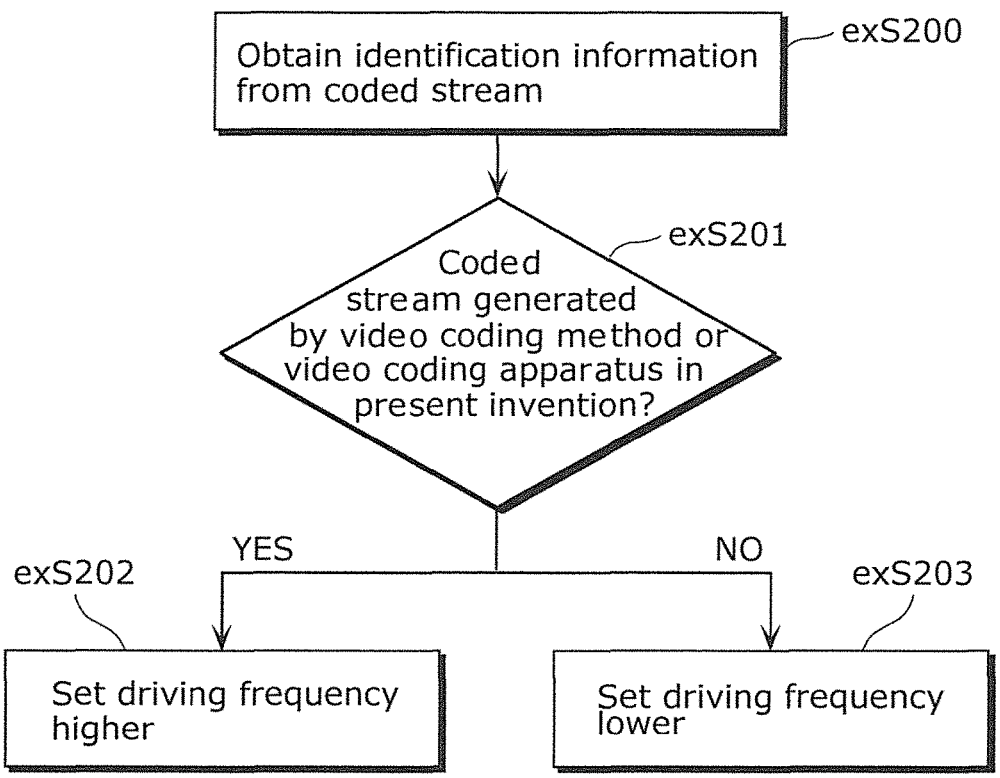
FIG. 39 shows steps for identifying video data and switching between driving frequencies.

FIG. 39 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 11

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 41A:
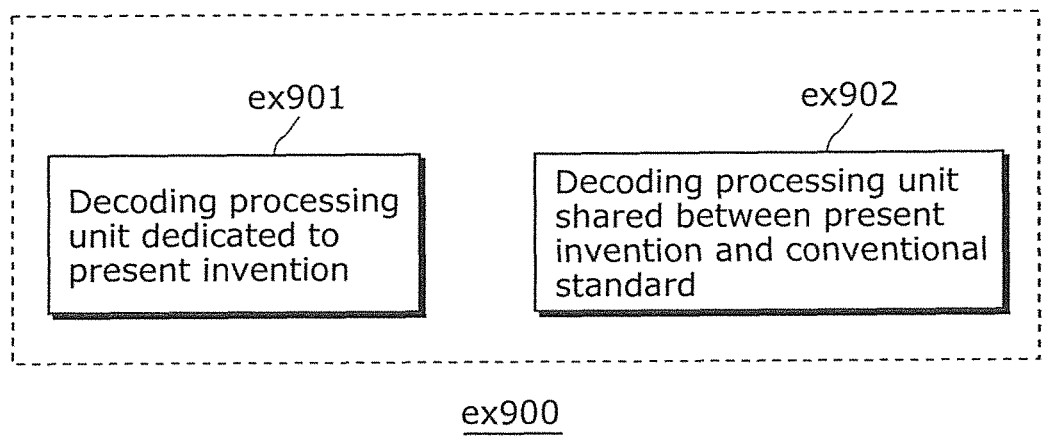
FIG. 41A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 41A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 41B:
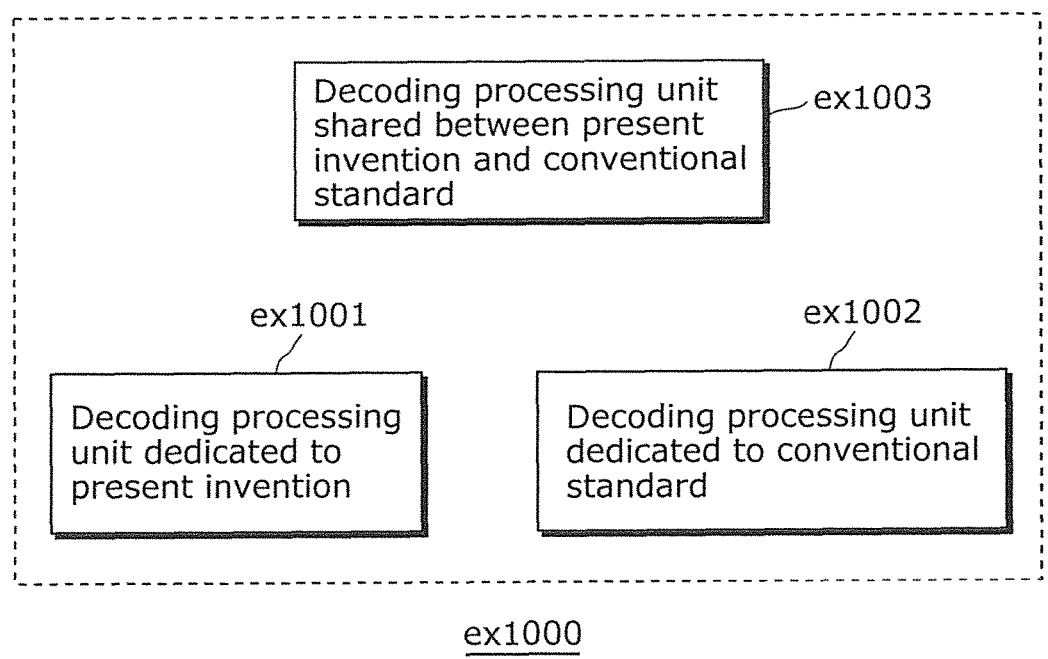
FIG. 41B is a diagram showing another example of a configuration for sharing a module of the signal processing unit.

Furthermore, ex1000 in FIG. 41B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The image coding method and the image decoding method according to the present invention can be used for various purposes. For example, the present invention can be used for a high-resolution image display apparatus and a high-resolution image pickup apparatus, such as a television, a digital video recorder, a car navigation system, a cellular phone, a digital camera, and a digital video camera.

REFERENCE SIGNS LIST 100, 300 Chroma-signal intra prediction unit
110, 330, 510, 610, 710, 830, 940, 1030 Intra-predicted chroma-signal generation unit
120, 520, 620, 720 Residual signal calculation unit
130, 210, 530, 630, 730 Transform-quantization unit
135, 230, 535, 635, 735 Inverse quantization-transform unit
140 Coded-signal generation unit
150, 570, 670, 770 Coding unit
200 Image coding apparatus
205 Subtracter
220 Entropy coding unit
235, 425 Adder
240, 430 Deblocking filter
250, 440 Memory
260, 450 Intra prediction unit
270 Motion estimation unit
280, 460 Motion compensation unit
290, 470 Intra/inter selection switch
310, 810, 910, 1010 Variable-length decoding unit
320, 820, 920, 1020 Residual signal obtainment unit
340 Decoded-chroma-signal generation unit
400 Image decoding apparatus
410 Entropy decoding unit
500, 600, 700, 800, 900, 1000 Image processing apparatus
540, 640, 740 temporary coded chroma-signal generation unit
550, 650, 750 First DC component calculation unit
555, 655, 755 Second DC component calculation unit
560, 660, 760 Offset value calculation unit
580, 680, 780, 850, 950, 1060 Offset value addition unit
690, 960 Offsetting determination unit
790 Unit-of-offsetting determination unit

840, 930, 1040 Temporary decoded chroma-signal generation unit

1070 Unit-of-offsetting information obtainment unit

The invention claimed is:

1. An image coding-decoding apparatus comprising:
an image coding apparatus; and
an image decoding apparatus,
wherein the image coding apparatus includes a first processor and a first non-transitory memory storing thereon a first program, which when executed by the first processor, causes the first processor to perform:
generating a first predicted block for an input block included in an image;
calculating a residual block by subtracting the first predicted block from the input block;
calculating first quantized coefficients by performing transform and quantization on the residual block;
calculating a coded residual block, the coded residual block being reconstructed by performing inverse quantization and inverse transform on the first quantized coefficients;
generating a first temporary decoded block by adding the coded residual block to the first predicted block, the first temporary decoded block including a first chroma component and a first luma component;
determining whether or not a first offset process for correcting an error included in the first chroma component using first offset values is required, to generate first information indicating a result of the determination for the first chroma component, the error included in the first chroma component being caused by the quantization;
determining whether or not a second offset process for correcting an error included in the first luma component using second offset values is required, to generate second information indicating a result of the determination for the first luma component, the error included in the first luma component being caused by the quantization;
executing the first offset process on the first chroma component when it is determined that the first offset process is required;
executing the second offset process on the first luma component when it is determined that the second offset process is required;
determining first flag information, the first flag information indicating whether the first offset values and the second offset values are derived from (i) third offset values calculated for a previously-coded block adjacent to the first temporary decoded block or (ii) fourth offset values calculated for the first temporary decoded block; and
performing variable-length coding on (i) the first quantized coefficients and the first flag information, when it is determined that the first flag information indicating that the first offset values and the second offset values are derived from fourth offset values, and further performing variable-length coding on (ii) the first information and (iii) the second information to obtain a first bitstream,
wherein the image decoding apparatus includes a second processor and a second non-transitory memory storing thereon a second program, which when executed by the second processor, causes the second processor to perform:
performing variable-length decoding on a second bitstream to obtain (i) second quantized coefficients and second flag information,
further performing variable-length decoding on (ii) third information and (iii) fourth information based on the second flag information;
performing inverse quantization and inverse transform on the second quantized coefficients to obtain a decoded residual block;
generating a second predicted block for the decoded residual block;
adding the decoded residual block to the second predicted block to generate a second temporary decoded block, the second temporary decoded block including a second chroma component and a second luma component;
executing, on the second chroma component using fifth offset values, a third offset process, when the third information indicates that the third offset process is required, the third offset process being for modifying a value of the second chroma component; and
executing, on the second luma component using sixth offset values, a fourth offset process, when the fourth information indicates that the fourth offset process is required, the fourth offset process being for modifying a value of the second luma component, and
wherein the second flag information indicates whether or not the fifth offset values and the sixth offset values are derived from seventh offset values calculated for a previously-decoded block adjacent to the second temporary decoded block.

* * * * *